(12) United States Patent
Kajiyama et al.

(10) Patent No.: US 12,477,269 B2
(45) Date of Patent: Nov. 18, 2025

(54) ULTRASONIC TRANSDUCER, DISTANCE MEASUREMENT APPARATUS, AND METHOD OF MANUFACTURING ULTRASONIC TRANSDUCER

(71) Applicant: Mitsubishi Electric Corporation, Tokyo (JP)

(72) Inventors: Yoshitaka Kajiyama, Tokyo (JP); Nobuaki Konno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 18/283,467

(22) PCT Filed: Apr. 13, 2021

(86) PCT No.: PCT/JP2021/015312
§ 371 (c)(1),
(2) Date: Sep. 22, 2023

(87) PCT Pub. No.: WO2022/219717
PCT Pub. Date: Oct. 20, 2022

(65) Prior Publication Data
US 2024/0179452 A1 May 30, 2024

(51) Int. Cl.
*H04R 7/04* (2006.01)
*G01S 15/08* (2006.01)
(Continued)

(52) U.S. Cl.
CPC ............ *H04R 1/2807* (2013.01); *G01S 15/08* (2013.01); *H04R 7/04* (2013.01); *H04R 7/20* (2013.01); *H04R 17/00* (2013.01); *H04R 31/003* (2013.01)

(58) Field of Classification Search
CPC .......... H04R 1/2807; H04R 7/04; H04R 7/20; H04R 17/00; H04R 31/003
See application file for complete search history.

(56) References Cited

U.S. PATENT DOCUMENTS

2008/0174665 A1 7/2008 Enstad et al.
2011/0048138 A1 3/2011 Li
(Continued)

FOREIGN PATENT DOCUMENTS

CN 111001553 A 4/2020
JP 2546488 B2 10/1996
(Continued)

OTHER PUBLICATIONS

International Search Report and Written Opinion mailed on Jul. 13, 2021, received for PCT Application PCT/JP2021/015312, filed on Apr. 13, 2021, 9 pages including English Translation.
(Continued)

*Primary Examiner* — Suhan Ni
(74) *Attorney, Agent, or Firm* — XSENSUS LLP

(57) ABSTRACT

An ultrasonic transducer includes a diaphragm and a housing. The diaphragm can be vibrated. The housing is connected to the diaphragm. The diaphragm is provided with an opening. The housing is provided with an internal space. The internal space communicates with the opening. The diaphragm and the housing constitute an acoustic resonance structure to amplify with the opening and the internal space, ultrasound generated by vibration of the diaphragm, and they are integrally formed.

10 Claims, 24 Drawing Sheets

(51) Int. Cl.
  *H04R 1/28*   (2006.01)
  *H04R 7/20*   (2006.01)
  *H04R 17/00*  (2006.01)
  *H04R 31/00*  (2006.01)

(56) References Cited

U.S. PATENT DOCUMENTS

| | | |
|---|---|---|
| 2014/0153750 A1 | 6/2014 | Konno et al. |
| 2016/0119718 A1* | 4/2016 | Yang ........................ H04R 1/24 381/351 |
| 2021/0223577 A1* | 7/2021 | Zhang ..................... H04S 7/304 |
| 2022/0417669 A1* | 12/2022 | Fowler ..................... H04R 7/10 |

FOREIGN PATENT DOCUMENTS

| | | |
|---|---|---|
| JP | 2010-515335 A | 5/2010 |
| WO | 2008/082308 A1 | 7/2008 |
| WO | 2013/042316 A1 | 3/2013 |
| WO | 2020/136983 A1 | 7/2020 |

OTHER PUBLICATIONS

Office Action issued Nov. 12, 2024 in Japanese Patent Application No. 2023-514223, 9 pages.

\* cited by examiner

ULTRASONIC TRANSDUCER, DISTANCE MEASUREMENT APPARATUS, AND METHOD OF MANUFACTURING ULTRASONIC TRANSDUCER

CROSS-REFERENCE TO RELATED APPLICATION

This application is based on PCT filing PCT/JP2021/015312, filed Apr. 13, 2021, the entire contents of which are incorporated herein by reference.

TECHNICAL FIELD

The present disclosure relates to an ultrasonic transducer, a distance measurement apparatus, and a method of manufacturing an ultrasonic transducer.

BACKGROUND ART

An ultrasonic transducer is used as a distance sensor for such applications as surveillance of an area around a car and a guided vehicle and a wireless operation of a device. Bulk lead zirconate titanate (PZT: $Pb(Zr, Ti)O_3$) is often used for a generally used ultrasonic transducer. Reduction in size of the ultrasonic transducer made of bulk PZT, however, is restricted by machining accuracy. Therefore, a micro electro mechanical systems (MEMS) ultrasonic transducer has been developed as an ultrasonic transducer that can be reduced in size.

A thin-film diaphragm (membrane) is included in a most general MEMS ultrasonic transducer. Silicon (Si) which is a semiconductor is employed as a material for a structure of the MEMS ultrasonic transducer including the diaphragm. The MEMS ultrasonic transducer is processed based on a semiconductor technology such as deep reactive ion etching (DRIE). By applying the semiconductor technology with high dimension accuracy to process of the diaphragm, the MEMS ultrasonic transducer can be reduced in size.

For example, Japanese National Patent Publication No. 2010-515335 (PTL 1) describes an audio source tracking microphone (ultrasonic transducer) including a MEMS microphone and an acoustic resonance structure. The acoustic resonance structure has a cavity and a sound entry channel. The acoustic resonance structure is constructed to amplify with the cavity and the entry channel, sound which enters the acoustic resonance structure.

CITATION LIST

Patent Literature

PTL 1: Japanese National Patent Publication No. 2010-515335

SUMMARY OF INVENTION

Technical Problem

In the literature, the MEMS microphone is arranged in the cavity in the acoustic resonance structure. Therefore, the acoustic resonance structure should be formed after arrangement of the microphone in the cavity in the acoustic resonance structure. It is thus difficult to accurately manufacture the acoustic resonance structure, and hence dimension accuracy of the acoustic resonance structure is lowered.

The present disclosure was made in view of problems above, and an object thereof is to provide an ultrasonic transducer, a distance measurement apparatus, and a method of manufacturing an ultrasonic transducer which can achieve suppression of lowering in dimension accuracy of an acoustic resonance structure.

Solution to Problem

An ultrasonic transducer according to the present disclosure includes a diaphragm and a housing. The diaphragm can be vibrated. The housing is connected to the diaphragm. The diaphragm is provided with an opening. The housing is provided with an internal space. The internal space communicates with the opening. The diaphragm and the housing constitute an acoustic resonance structure to amplify with the opening and the internal space, ultrasound generated by vibration of the diaphragm, and the diaphragm and the housing are integrally formed.

Advantageous Effects of Invention

According to the ultrasonic transducer in the present disclosure, lowering in dimension accuracy of the acoustic resonance structure can be suppressed.

DESCRIPTION OF EMBODIMENTS

Figure 1:
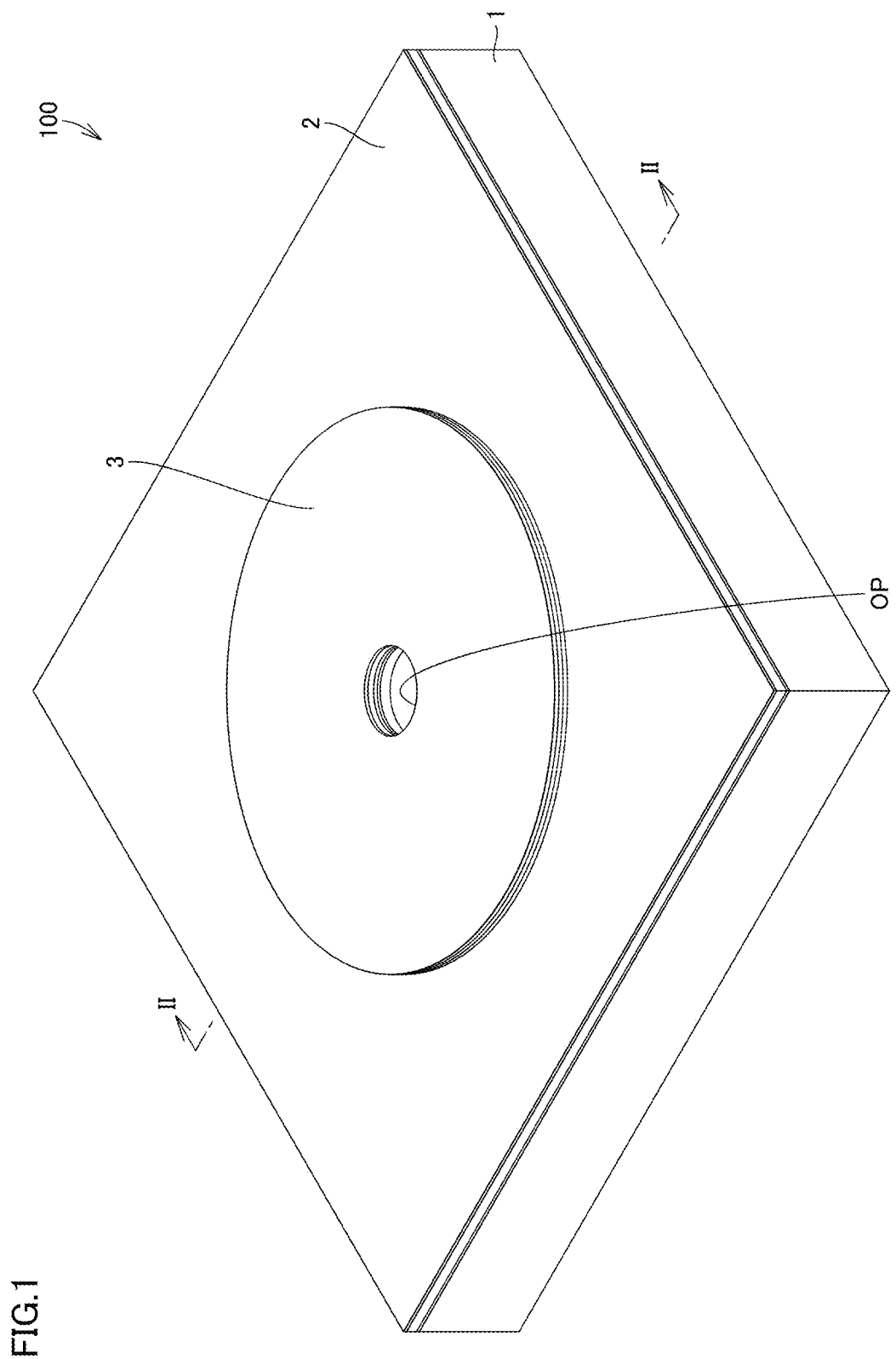
FIG. 1 is a perspective view schematically showing a construction of an ultrasonic transducer according to a first embodiment.

An embodiment will be described below with reference to the drawings. The same or corresponding elements have the same reference characters allotted below and redundant description will not be repeated.

First Embodiment

A construction of an ultrasonic transducer 100 according to a first embodiment will be described with reference to FIGS. 1 and 2.

As shown in FIG. 1, ultrasonic transducer 100 includes a housing 1 and a diaphragm 2. Ultrasonic transducer 100 according to the present embodiment further includes a first piezoelectric element 3. Though a side surface of first piezoelectric element 3 is shown as being flat in FIG. 1 for the sake of convenience of description, a step is provided in the side surface of first piezoelectric element 3 as shown in FIG. 2.

Figure 2:
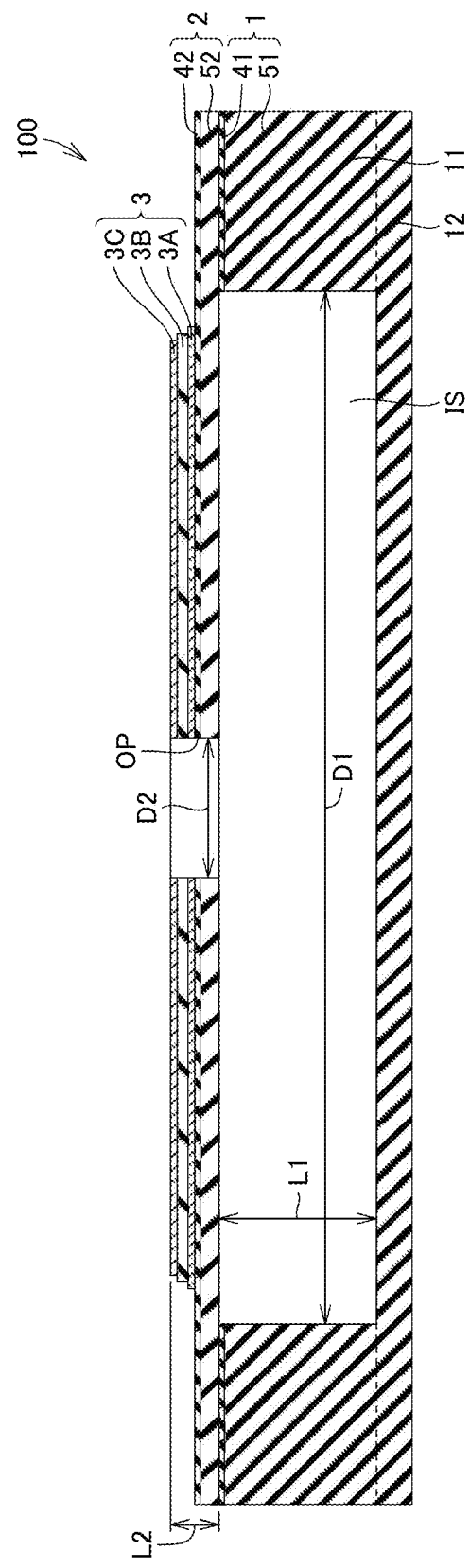
FIG. 2 is a cross-sectional view along the line II-II in FIG. 1.

As shown in FIG. 2, housing 1 is connected to diaphragm 2. Housing 1 is provided with an internal space IS. Housing 1 includes a first silicon layer 51 and a first oxide film 41. First silicon layer 51 has a peripheral wall portion 11 and a bottom 12. FIG. 2 shows a boundary between peripheral wall portion 11 and bottom 12 with a dashed line. Peripheral wall portion 11 is connected to bottom 12 as erecting from bottom 12. Peripheral wall portion 11 surrounds internal space IS. Bottom 12 sandwiches internal space IS between the bottom and diaphragm 2. First oxide film 41 is layered on peripheral wall portion 11. First oxide film 41 is sandwiched between peripheral wall portion 11 and diaphragm 2. Housing 1 may have an outer geometry in a shape of a parallelepiped or a column.

Diaphragm 2 is connected to housing 1 to cover internal space IS. This structure may be called a cavity structure. Diaphragm 2 is provided with an opening OP. Opening OP penetrates diaphragm 2. Desirably, opening OP is provided to pass through a center in an in-plane direction of diaphragm 2. Internal space IS communicates with opening OP. Opening OP may be in a circular or rectangular shape.

Diaphragm 2 can be vibrated. Specifically, diaphragm 2 can be vibrated by first piezoelectric element 3. Diaphragm 2 is constructed to generate ultrasound by vibration. Principles of generation of ultrasound by diaphragm 2 will be described later.

Diaphragm 2 includes a second silicon layer 52 and a second oxide film 42. Opening OP penetrates second silicon layer 52 and second oxide film 42. Second silicon layer 52 is layered on first oxide film 41. Second oxide film 42 is layered on second silicon layer 52.

Housing 1 and diaphragm 2 constitute an acoustic resonance structure to amplify with opening OP and internal space IS, ultrasound generated by vibration of diaphragm 2. The acoustic resonance structure is integrally formed. For example, a Helmholtz resonator may be adopted as the acoustic resonance structure. Details of the acoustic resonance structure will be described later.

Housing 1 and diaphragm 2 are integrally formed. In other words, housing 1 and diaphragm 2 are connected to each other without a gap. More specifically, first oxide film 41 of housing 1 and second silicon layer 52 of diaphragm 2 are connected to each other without a gap. In the present embodiment, "being integrally formed" and "being connected without a gap" means connection by bonding at an atomic or molecular level, such as covalent bond. Desirably, housing 1 and diaphragm 2 are integrally formed based on the MEMS technology. A method of manufacturing housing 1 and diaphragm 2 based on the MEMS technology will be described later.

Silicon (Si) to which a semiconductor manufacturing technology is readily applicable, silicon being a material having mechanical characteristics excellent as an elastic material, is desirable as a material for peripheral wall portion 11 and bottom 12 (first silicon layer 51) of housing 1 and second silicon layer 52 of diaphragm 2. First oxide film 41 and second oxide film 42 are, for example, silicon (Si) oxide films.

First piezoelectric element 3 is connected to diaphragm 2. First piezoelectric element 3 is arranged on diaphragm 2. Specifically, first piezoelectric element 3 is arranged on second oxide film 42 of diaphragm 2. First piezoelectric element 3 is arranged opposite to internal space IS, with respect to diaphragm 2. In other words, first piezoelectric element 3 is arranged outside internal space IS. As shown in FIG. 1, first piezoelectric element 3 is annular. First piezoelectric element 3 is arranged to expose opening OP.

First piezoelectric element 3 is constructed as an actuator to vibrate diaphragm 2. First piezoelectric element 3 is constructed to vibrate diaphragm 2 when ultrasound is transmitted. First piezoelectric element 3 is constructed as a strain gauge to measure strain of diaphragm 2. First piezoelectric element 3 is constructed to function as the strain gauge of diaphragm 2 at the time of reception of ultrasound. Vibration of diaphragm 2 is thus measured at the time of reception of ultrasound. Ultrasonic transducer 100 is constructed to apply a voltage to first piezoelectric element 3. A not-shown power supply may electrically be connected to the first piezoelectric element.

As shown in FIG. 2, first piezoelectric element 3 includes a lower electrode 3A, a piezoelectric thin film 3B, and an upper electrode 3C. Lower electrode 3A and upper electrode 3C sandwich piezoelectric thin film 3B therebetween. Lower electrode 3A is arranged on diaphragm 2. Piezoelectric thin film 3B is arranged opposite to internal space IS with respect to lower electrode 3A. Lower electrode 3A, piezoelectric thin film 3B, and upper electrode 3C have outer diameters decreasing in this order.

For example, lead zirconate titanate (PZT: $Pb(Zr, Ti)O_3$), aluminum nitride (AlN), or potassium sodium niobate (KNN: $(K, Na)NbO_3$) is employed as a material for piezoelectric thin film 3B. Desirably, a layered film of a titanium (Ti) film and a platinum (Pt) film generally used for a piezoelectric element is employed as a material for lower electrode 3A and upper electrode 3C. Another layered film with sufficient conductivity as an electrode and good adhesiveness to an underlying layer may be applicable as the material for lower electrode 3A and upper electrode 3C. An oxide electrode film such as a strontium oxide (SrO) film effective to lower polarization fatigue may be arranged between upper electrode 3C and piezoelectric thin film 3B.

An operation of ultrasonic transducer 100 according to the first embodiment will now be described.

As a voltage is applied across lower electrode 3A and upper electrode 3C, piezoelectric thin film 3B contracts. As piezoelectric thin film 3B contracts, diaphragm 2 is bent. As a voltage having a frequency close to a resonance frequency of diaphragm 2 is applied to piezoelectric thin film 3B, diaphragm 2 is vibrated by resonant vibration. In the present embodiment, the frequency close to the resonance frequency of diaphragm 2 refers to a frequency within a range where vibration displacement of diaphragm 2 is at least $2^{-1/2}$ times and at most $2^{1/2}$ times as large as maximum displacement (peak displacement). Ultrasound is thus generated.

When ultrasonic transducer 100 is employed as an ultrasonic sensor, vibration of diaphragm 2 vibrated by ultrasound is obtained as a voltage signal through first piezoelectric element 3.

Dimensions of internal space IS in housing 1 and opening OP in diaphragm 2 are set such that the resonance frequency of housing 1 is close to the resonance frequency of diaphragm 2. In the present embodiment, the resonance frequency of housing 1 being close to the resonance frequency of diaphragm 2 means that the resonance frequency of housing 1 is set to a frequency within a range where vibration displacement of diaphragm 2 is at least $2^{-1/2}$ times and at most $2^{1/2}$ times as large as maximum displacement. A sound pressure of ultrasound generated by vibration of diaphragm 2 is thus amplified by the acoustic resonance structure.

The resonance frequency of the acoustic resonance structure is expressed in an expression (1) below, with D1 representing a diameter of internal space IS, D2 representing a diameter of opening OP, L1 representing a height of internal space IS, L2 representing a height of opening OP, a representing end correction, $S_m$ representing an area in the in-plane direction of opening OP, and $V_c$ representing a volume of internal space IS. Area Sm in the in-plane direction of opening OP is expressed in an expression (2) below. Volume Ve of internal space IS is expressed in an expression (3) below.

[Expression 1]
$$f_h = \frac{c}{2\pi} \sqrt{\frac{S_m}{(l_1 + a(d/2))}} \qquad \text{Expression 1}$$

[Expression 2]
$$S_m = \pi(d/2)^2 \qquad \text{Expression 2}$$

[Expression 3]
$$V_c = \pi(D/2)^2 l_2 \qquad \text{Expression 3}$$

When ultrasonic transducer 100 is employed as the ultrasonic sensor, the sound pressure of received ultrasound is amplified by acoustic resonance and hence vibration of diaphragm 2 becomes greater. Since strain of first piezoelectric element 3 thus becomes greater, the amplified signal is obtained.

A method of manufacturing ultrasonic transducer 100 according to the first embodiment will now be described with reference to FIGS. 2 to 5.

Figure 3:
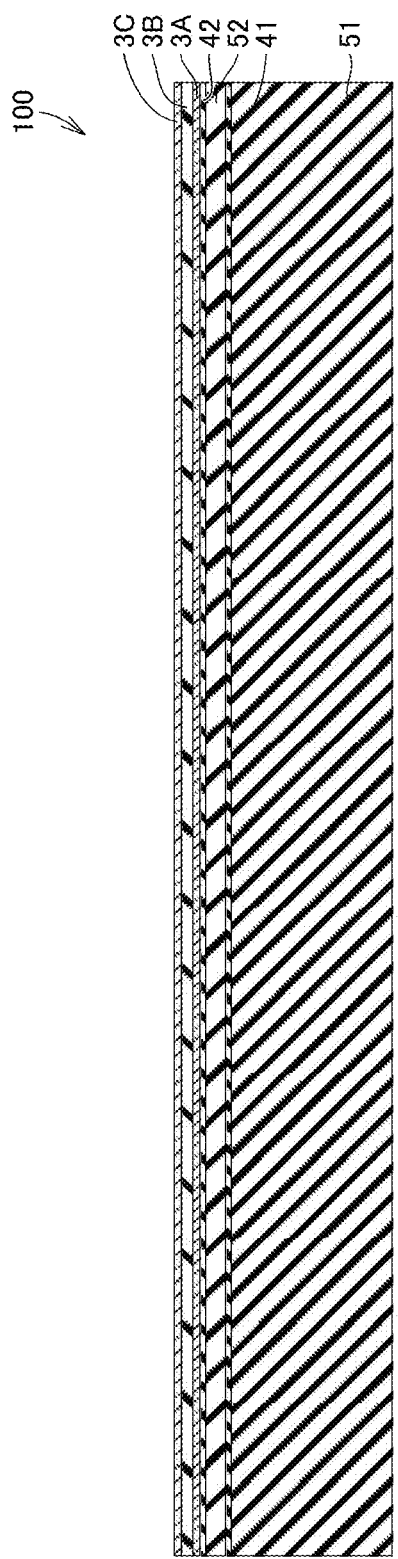
FIG. 3 is a cross-sectional view schematically showing layering of a lower electrode, a piezoelectric thin film, and an upper electrode on a substrate used for manufacturing of the ultrasonic transducer according to the first embodiment.

As shown in FIG. 3, in a preparation step, a substrate 9 is prepared. Substrate 9 is a silicon on insulator (SOI) substrate. Ultrasonic transducer 100 according to the present embodiment is manufactured by process of the SOI substrate. Substrate 9 includes, for example, first silicon layer 51, second silicon layer 52, first oxide film 41, and second oxide film 42. First silicon layer 51 has a thickness, for example, not smaller than 100 μm and not larger than 600 μm. Second silicon layer 52 has a thickness, for example, not smaller than 1 μm and not larger than 100 μm. Second oxide film 42 is provided as a surface oxide film. A thermal oxidation method capable of achieving small surface roughness is suitable as a method of forming second oxide film 42.

In succession, lower electrode 3A, piezoelectric thin film 3B, and upper electrode 3C are successively formed on second oxide film 42. Lower electrode 3A, piezoelectric thin film 3B, and upper electrode 3C are formed by sputtering or chemical solution deposition (CSD). Lower electrode 3A and upper electrode 3C each have a thickness, for example, of 0.1 μm. Piezoelectric thin film 3B has a thickness, for example, not smaller than 1 μm and not larger than 9 μm.

Figure 4:
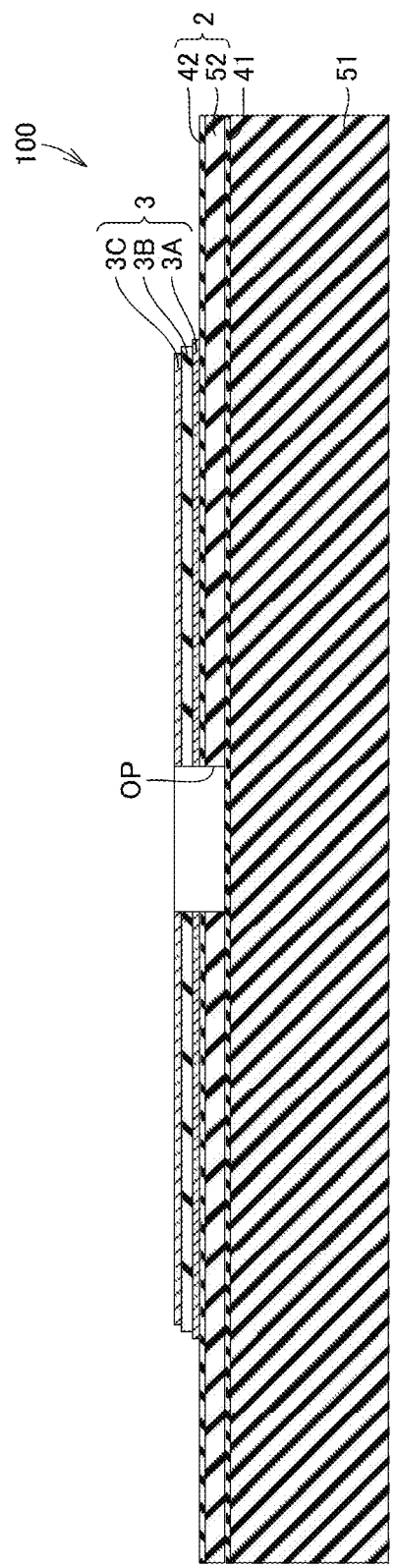
FIG. 4 is a cross-sectional view schematically showing provision of an opening in the substrate used for manufacturing of the ultrasonic transducer according to the first embodiment.

In succession, as shown in FIG. 4, lower electrode 3A, piezoelectric thin film 3B, upper electrode 3C, second oxide film 42, and second silicon layer 52 are patterned.

Specifically, photolithography where a resist film is used as a protective film is suitable for patterning of upper electrode 3C. Reactive ion etching (RIE) or photoetching where an etchant is used is employed as etching of upper electrode 3C. In any etching, a condition for obtaining a sufficient etch selectivity between upper electrode 3C and an underlying film should be set. For example, in an example where PZT is adopted for piezoelectric thin film 3B, the layered film of the titanium (Ti) film and the platinum (Pt) film is adopted as upper electrode 3C, and the layered film is patterned by reactive ion etching, chlorine ($Cl_2$)/argon (Ar)-based gas is suitable. After upper electrode 3C is patterned, the resist film is removed. Oxygen ($O_2$) ashing or the like is used for removal of the resist film.

In succession, with photolithography and etching, piezoelectric thin film 3B is patterned. For example, reactive ion etching or wet etching is adopted as etching. In etching, a condition for obtaining a sufficient etch selectivity between piezoelectric thin film 3B and an underlying layer should be set. For example, the layered film of the titanium (Ti) film and the platinum (Pt) film and PZT may be adopted for lower electrode 3A and piezoelectric thin film 3B, respectively, and the layered film may be patterned by reactive ion etching. In this case, chlorine ($Cl_2$)-, boron chloride ($BCl_2$)-, or hydrochloric acid ($CH_4$)-based gas is suitable. After piezoelectric thin film 3B is patterned, the resist film is removed by oxygen ($O_2$) ashing or the like.

In succession, lower electrode 3A is patterned by photolithography and etching. For example, reactive ion etching or wet etching is adopted as etching. In etching, a condition for obtaining a sufficient etch selectivity between lower electrode 3A and an underlying layer should be set. For example, in an example where the layered film of the titanium (Ti) film and the platinum (Pt) film is adopted as lower electrode 3A and the layered film is patterned by reactive ion etching, chlorine ($Cl_2$)/argon (Ar)-based gas is suitable. After lower electrode 3A is patterned, the resist film is removed by oxygen ($O_2$) ashing or the like.

In succession, second oxide film 42 formed on second silicon layer 52 is patterned by photolithography and etching. For example, reactive ion etching or wet etching is adopted as etching. In an example where second oxide film 42 is patterned by reactive ion etching, chlorine ($Cl_2$)-based gas is suitable.

In succession, second silicon layer 52 is etched. Thus, in a formation step S102, opening OP is provided in diaphragm 2 (second silicon layer 52). For example, deep reactive ion etching is desirable as etching. Deep reactive ion etching is performed by a Bosch process where etching at a high aspect ratio can be performed. Etching is performed until first oxide film 41 is exposed. After etching, the resist film is removed by oxygen ($O_2$) ashing or the like.

Figure 5:
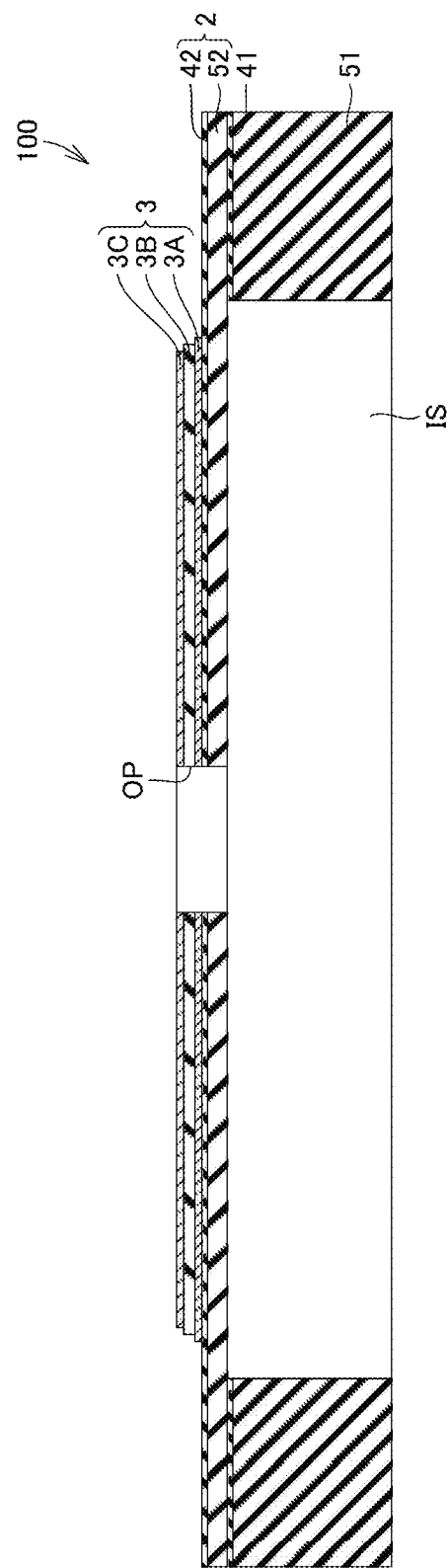
FIG. 5 is a cross-sectional view schematically showing provision of an internal space in the substrate used for manufacturing of the ultrasonic transducer according to the first embodiment.

In succession, as shown in FIG. 5, first silicon layer 51 is patterned by photolithography and etching. Thus, in formation step S102, internal space IS is provided in housing 1 (see FIG. 2) (first silicon layer 51). For example, reactive ion etching or wet etching is adopted as etching. Desirably, deep reactive ion etching (DRIE) by the Bosch process is adopted as etching. Etching is performed until first oxide film 41 is exposed. In succession, exposed first oxide film 41 is etched away. Reactive ion etching or wet etching is adopted as etching of first oxide film 41. In an example where first oxide film 41 is patterned by reactive ion etching, chlorine ($Cl_2$)-based gas is suitable.

In succession, as shown in FIGS. 2 and 5, a second substrate which is a silicon substrate is bonded to substrate 9. The second substrate serves as bottom 12 of housing 1. Surface activated bonding or room-temperature activated bonding is used for bonding between substrate 9 and the second substrate.

As set forth above, in formation step S102, housing 1 and diaphragm 2 are made by integral forming from the substrate based on the MEMS manufacturing technology. Housing 1 and diaphragm 2 are formed to constitute the acoustic resonance structure to amplify with opening OP and internal space IS, sound generated by vibration of diaphragm 2.

In succession, MEMS ultrasonic transducer 100 is completed, for example, by cutting the substrate into chip-size substrates by dicing.

Though the SOI substrate is prepared as substrate 9 in FIG. 4, substrate 9 is not limited thereto. For example, a cavity silicon on insulator (CSOI) substrate having a hollow structure in an initial state may be employed as the substrate. In an example where the CSOI substrate is employed, first piezoelectric element 3 and opening OP are provided over the hollow structure, and hence a step of patterning second silicon layer 52 and a step of bonding the second substrate do not have to be performed. Therefore, ultrasonic transducer 100 is more readily made.

A function and effect of the present embodiment will be described in succession.

According to ultrasonic transducer 100 according to the first embodiment, as shown in FIG. 2, housing 1 and diaphragm 2 constitute the acoustic resonance structure and they are integrally formed. Therefore, the acoustic resonance structure can accurately be manufactured. Specifically, the acoustic resonance structure can be manufactured more accurately than in an example where housing 1 and diaphragm 2 are separate from each other. The acoustic resonance structure can be manufactured more accurately, in particular, than in an example where the acoustic resonance structure is manufactured by fitting to each other, of housing 1 and diaphragm 2 which are separate from each other. Therefore, lowering in dimension accuracy of the acoustic resonance structure can be suppressed. In other words, dimension accuracy of the acoustic resonance structure can be improved.

As shown in FIG. 2, first piezoelectric element 3 is connected to diaphragm 2. Therefore, first piezoelectric element 3 can vibrate diaphragm 2. In addition, first piezoelectric element 3 can measure strain of diaphragm 2. Therefore, the frequency of ultrasound received by the acoustic resonance structure can be measured based on the strain of diaphragm 2.

As shown in FIG. 2, housing 1 and diaphragm 2 are integrally formed based on the MEMS manufacturing technology. Therefore, the acoustic resonance structure can accurately be manufactured. For example, the acoustic resonance structure can be manufactured with dimension accuracy within an error range not smaller than 1 μm and not larger than 10 μm.

According to the method of manufacturing ultrasonic transducer 100 according to the first embodiment, as shown in FIG. 3, housing 1 and diaphragm 2 are made by integral forming from substrate 9 based on the MEMS manufacturing technology. Therefore, the acoustic resonance structure can accurately be manufactured. Specifically, the acoustic resonance structure can be manufactured more accurately than in an example where housing 1 and diaphragm 2 are separate from each other. Therefore, lowering in dimension accuracy of the acoustic resonance structure can be suppressed.

As shown in FIG. 3, housing 1 and diaphragm 2 are made by integral forming from substrate 9 based on the MEMS manufacturing technology. Therefore, cost for assembly of ultrasonic transducer 100 can be lower, for example, than in an example where individually made housing 1 and diaphragm 2 are assembled by fitting to each other. In addition, an assembly (assembling) step more precise, for example, than in the example where individually made housing 1 and diaphragm 2 are assembled by fitting to each other is not required. Therefore, the acoustic resonance structure can readily be manufactured.

Second Embodiment

A construction of ultrasonic transducer 100 according to a second embodiment will now be described with reference to FIGS. 6 to 10. The second embodiment is identical in construction, manufacturing method, and function and effect to the first embodiment unless particularly described. Therefore, features identical to those in the first embodiment have identical reference characters allotted and description will not be repeated.

Figure 6:
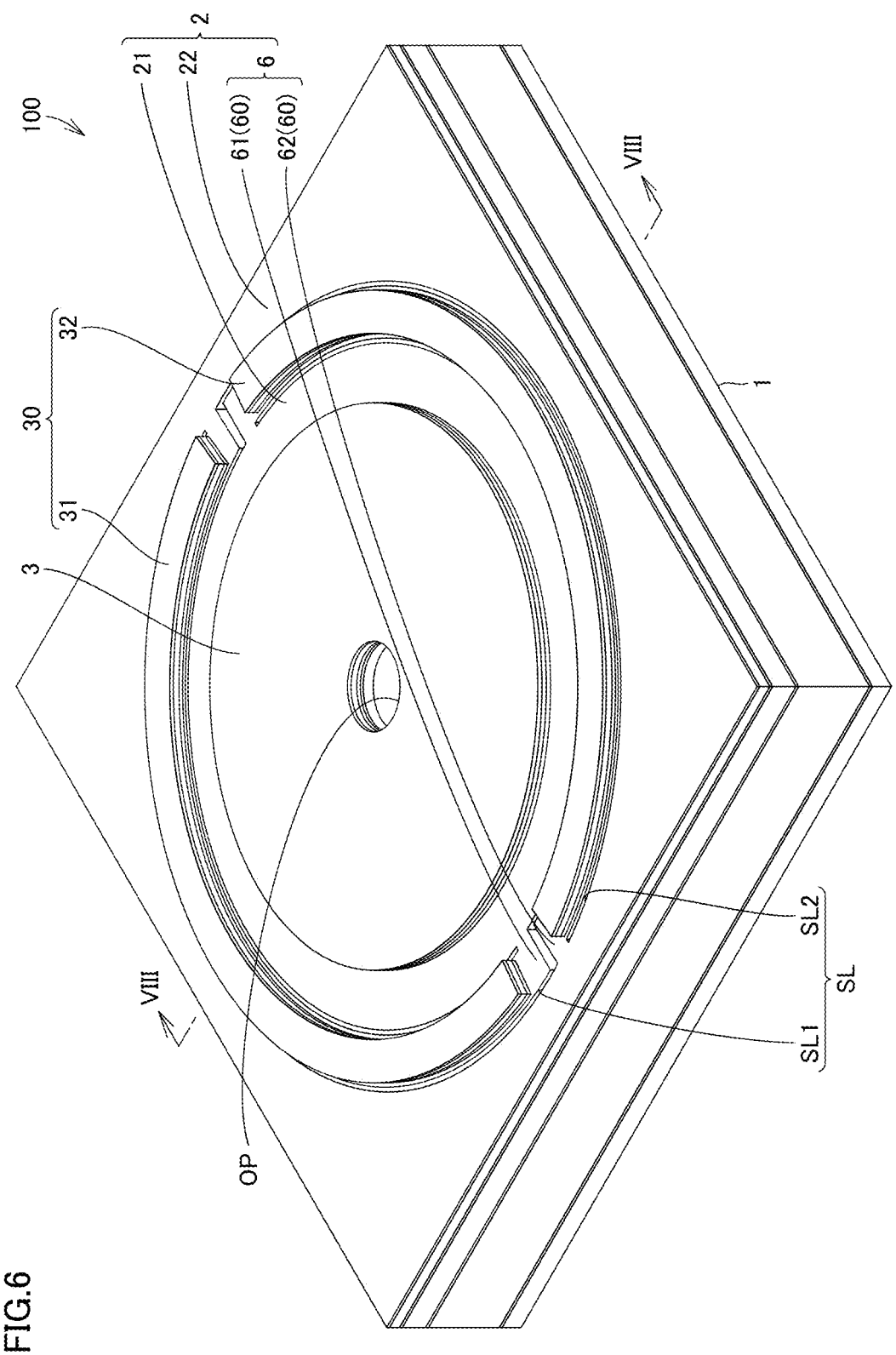
FIG. 6 is a perspective view schematically showing a construction of the ultrasonic transducer according to a second embodiment.
Figure 7:
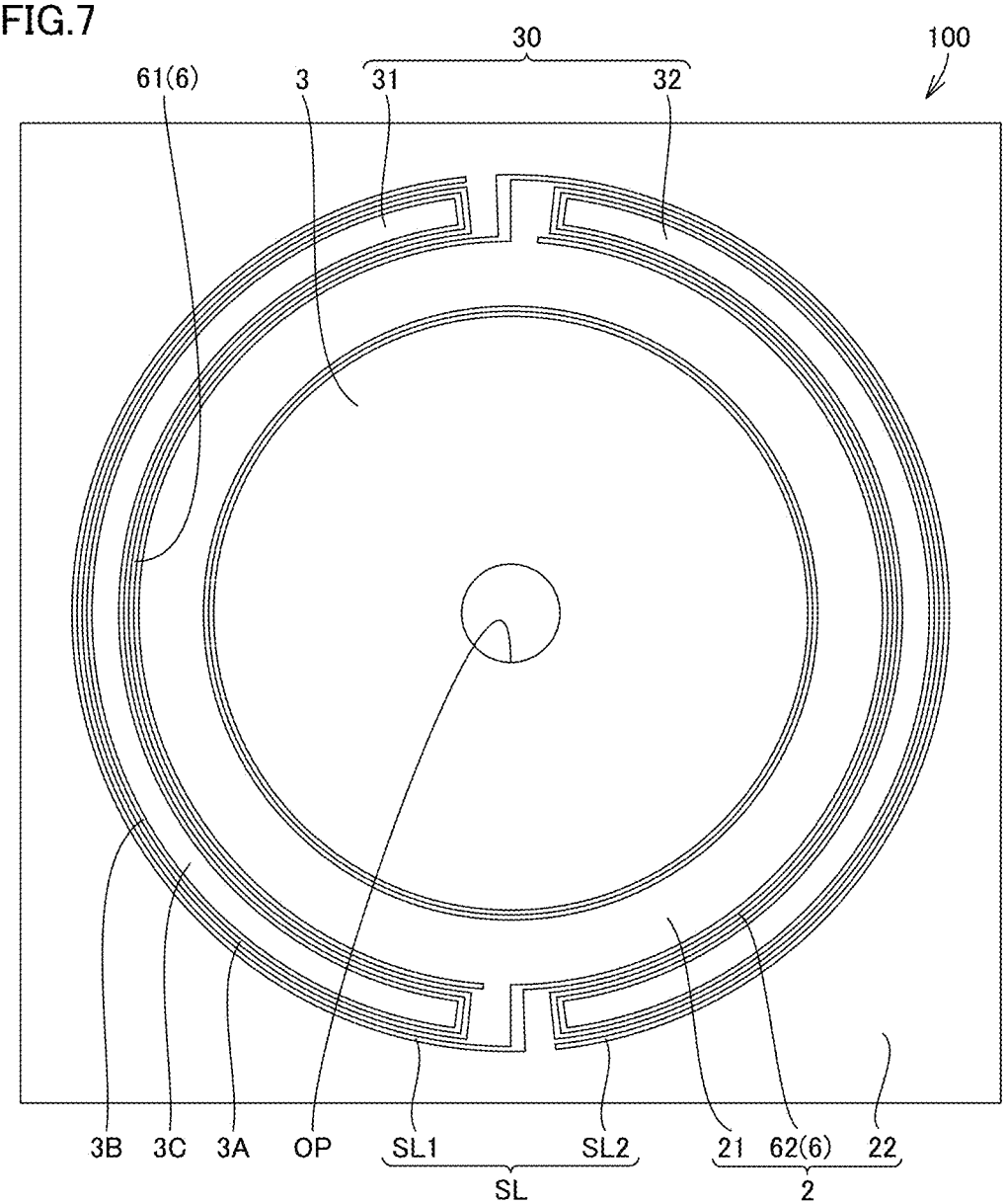
FIG. 7 is a top view schematically showing the construction of the ultrasonic transducer according to the second embodiment.

As shown in FIGS. 6 and 7, diaphragm 2 of ultrasonic transducer 100 according to the present embodiment includes a central portion 21, an outer peripheral portion 22, and a beam 6. First piezoelectric element 3 is connected to central portion 21. Central portion 21 is constructed to be vibrated by first piezoelectric element 3. Outer peripheral portion 22 is arranged around central portion 21. Beam 6 connects central portion 21 and outer peripheral portion 22 to each other, between central portion 21 and outer peripheral portion 22. Diaphragm 2 is provided with a slit SL. Slit SL is provided around beam 6. Therefore, beam 6 can be bent along a direction in which housing 1 and diaphragm 2 are connected to each other. Slit SL has a dimension in a direction of a short side, for example, of 10 μm. Though the side surface of first piezoelectric element 3 is shown as being flat in FIG. 6 for the sake of convenience of description, a step is provided in the side surface of first piezoelectric element 3 as shown in FIGS. 7 and 8.

Figure 8:
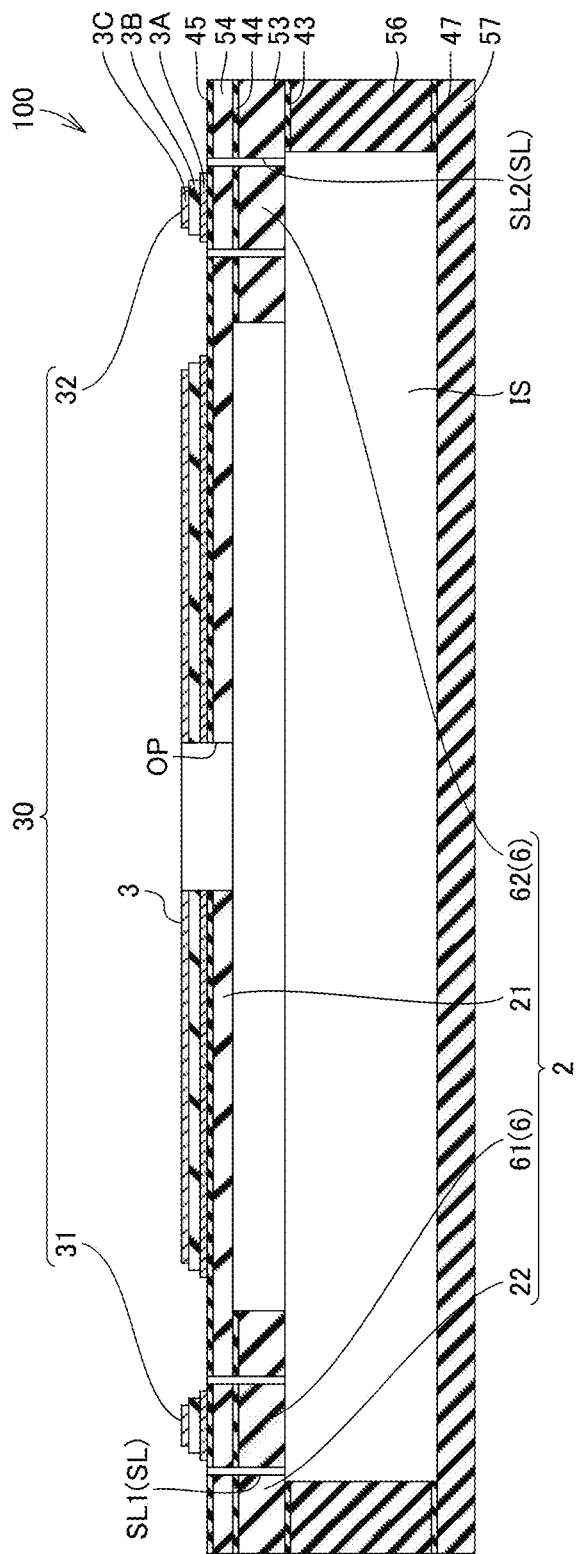
FIG. 8 is a cross-sectional view along the line VIII-VIII in FIG. 6.
Figure 9:
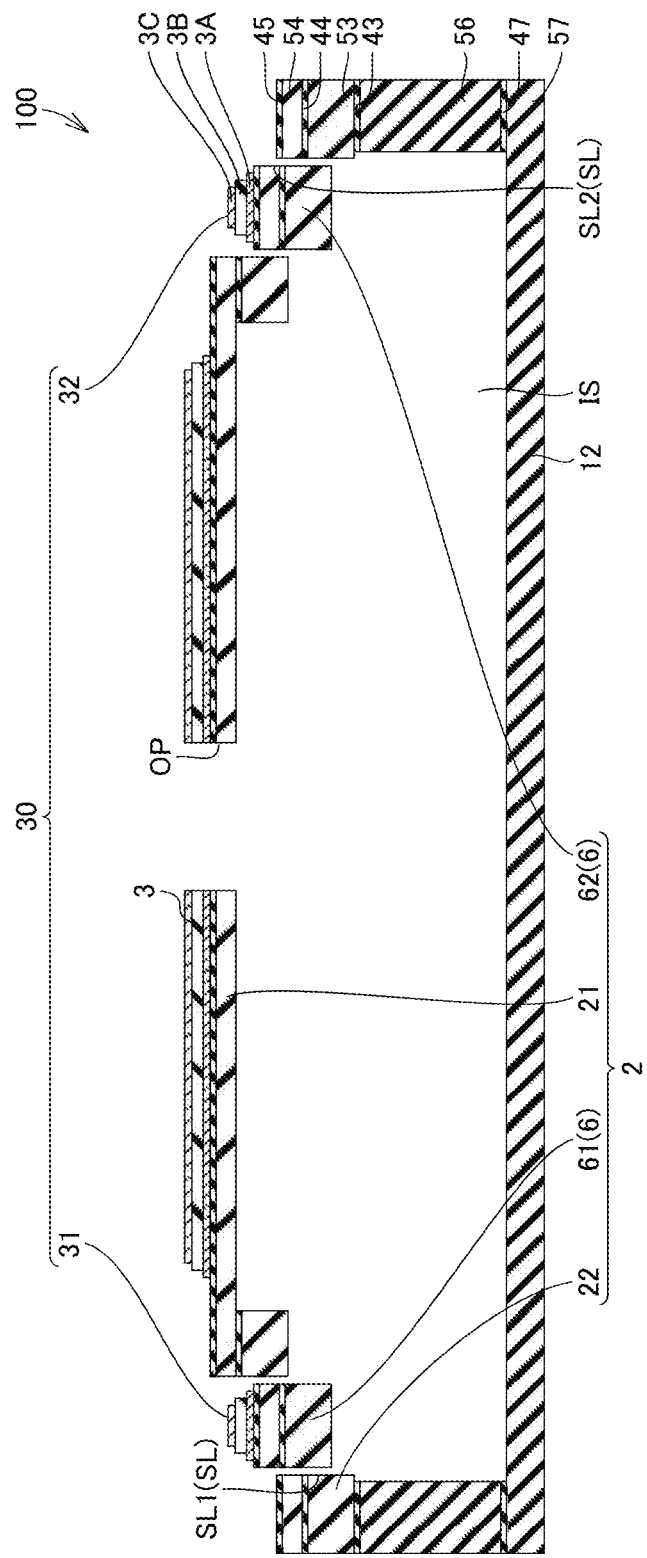
FIG. 9 is a cross-sectional view schematically showing movement away from a bottom of a housing, of a central portion and a beam of the ultrasonic transducer according to the second embodiment.
Figure 10:
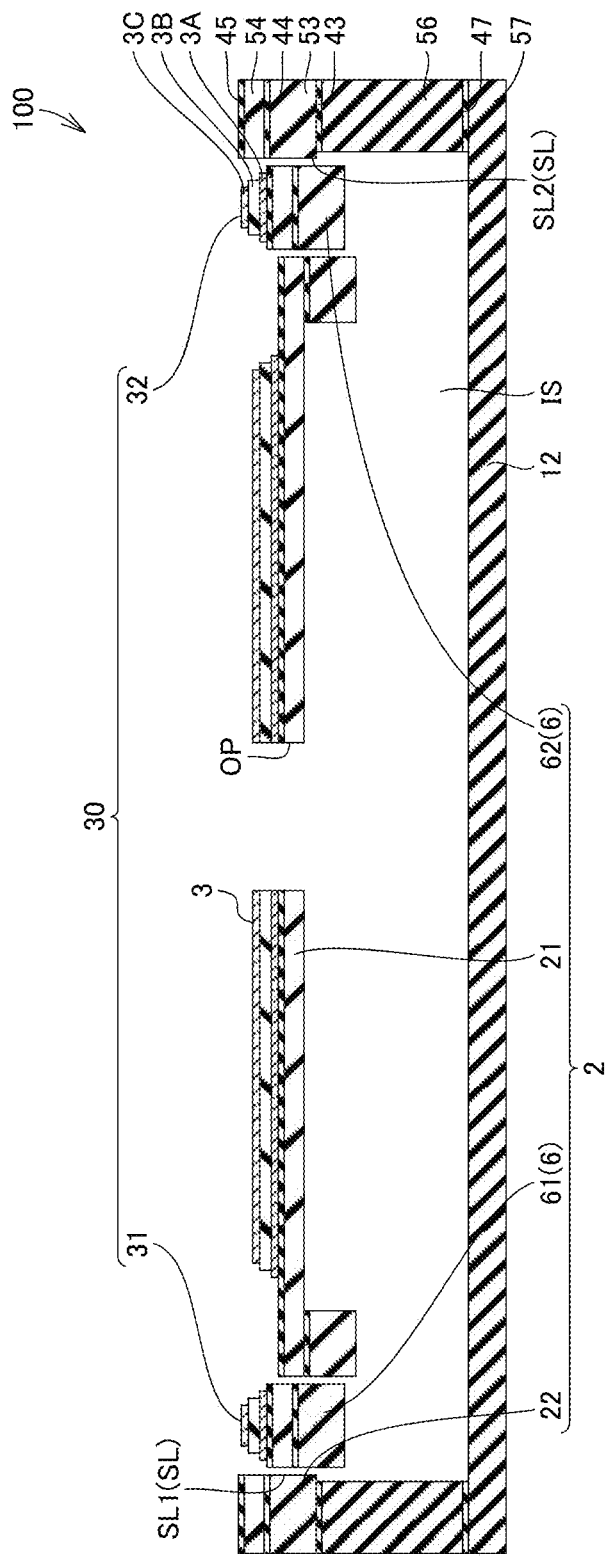
FIG. 10 is a cross-sectional view schematically showing movement toward the bottom of the housing, of the central portion and the beam of the ultrasonic transducer according to the second embodiment.

As shown in FIGS. 8 to 10, housing 1 and diaphragm 2 are constructed to vary a volume of internal space IS. As shown in FIG. 9, housing 1 and diaphragm 2 are constructed to vary a volume of internal space IS as beam 6 deforms to move away from bottom 12 of housing 1. More specifically, central portion 21 moves away from bottom 12 of housing 1 as beam 6 deforms to move away from bottom 12 of housing 1. The volume of internal space IS thus increases.

As shown in FIG. 10, housing 1 and diaphragm 2 may be constructed to vary a volume of internal space IS as beam 6 deforms toward bottom 12 of housing 1. More specifically, as beam 6 deforms toward bottom 12 of housing 1, central portion 21 moves toward bottom 12 of housing 1. The volume of internal space IS thus decreases.

An amount of deformation of beam 6 may be larger than an amount of maximum displacement by resonation of diaphragm 2. The amount of deformation of beam 6 may be equal to or smaller than the amount of maximum displacement by resonation of diaphragm 2. Desirably, a deformed shape of beam 6 is not varied by vibration of central portion 21.

Silicon (Si) to which the semiconductor manufacturing technology is readily applicable, silicon having mechanical characteristics excellent as an elastic material, is desirable as a material for beam 6.

As shown in FIG. 6, beam 6 includes a plurality of beam portions 60. The plurality of beam portions 60 can be bent along the direction in which housing 1 and diaphragm 2 are connected to each other. In the present embodiment, beam 6 includes a first beam portion 61 and a second beam portion 62. First beam portion 61 and second beam portion 62 can be bent along the direction in which housing 1 and diaphragm 2 are connected to each other. First beam portion 61 and second beam portion 62 may be in the same shape.

As shown in FIG. 7, when viewed in a direction from diaphragm 2 toward housing 1 (see FIG. 6), first beam portion 61 and second beam portion 62 are each in a C shape. Each of first beam portion 61 and second beam portion 62 is arranged along a circumferential direction of central portion 21. First beam portion 61 and second beam portion 62 are arranged at a distance from each other with slit SL being interposed. More specifically, first beam portion 61 and second beam portion 62 are arranged at a distance from each other, with a portion of slit SL that extends in a radial direction of central portion 21 being interposed.

Slit SL includes a first slit portion SL1 and a second slit portion SL2. First slit portion SL1 is provided around first beam portion 61. Second slit portion SL2 is provided around second beam portion 62. Each of first slit portion SL1 and second slit portion SL2 has a first slit part, a second slit part, and a third slit part. The first slit part is arranged on a side of central portion 21 relative to beam 6. The second slit part is arranged on a side of outer peripheral portion 22 relative to beam 6. The third slit part connects the first slit part and the second slit part to each other. Each of the first slit part and the second slit part is in the C shape. The first slit part and the second slit part are provided along the circumferential direction of central portion 21. The third slit part is provided along the radial direction of central portion 21. The third slit part is in a linear shape.

Ultrasonic transducer 100 further includes a second piezoelectric element 30. Second piezoelectric element 30 is connected to beam 6. Second piezoelectric element 30 is provided as an actuator to deform beam 6.

First piezoelectric element 3 and second piezoelectric element 30 are formed from common lower electrode 3A, upper electrode 3C, and piezoelectric thin film 3B. In the present embodiment, second piezoelectric element 30 includes a first element 31 and a second element 32. First element 31 is connected to first beam portion 61. Second element 32 is connected to second beam portion 62.

An operation of ultrasonic transducer 100 according to the second embodiment will now be described with reference to FIGS. 8 to 10.

As shown in FIGS. 8 to 10, as a voltage is applied to second piezoelectric element 30, second piezoelectric element 30 deforms. Since principles of deformation of second piezoelectric element 30 are common to principles of deformation of first piezoelectric element 3, description will not be provided. As second piezoelectric element 30 deforms, beam 6 is bent. Specifically, as a voltage is applied to each of first element 31 and second element 32, first element 31 and second element 32 deform. As first element 31 and second element 32 deform, first beam portion 61 and second beam portion 62 are bent, respectively. The volume of internal space IS is thus varied. Ultrasonic transducer 100 is constructed to receive or transmit ultrasound with the volume of internal space IS being varied.

A method of manufacturing ultrasonic transducer 100 according to the second embodiment will now be described with reference to FIGS. 8 and 11 to 17.

Figure 11:
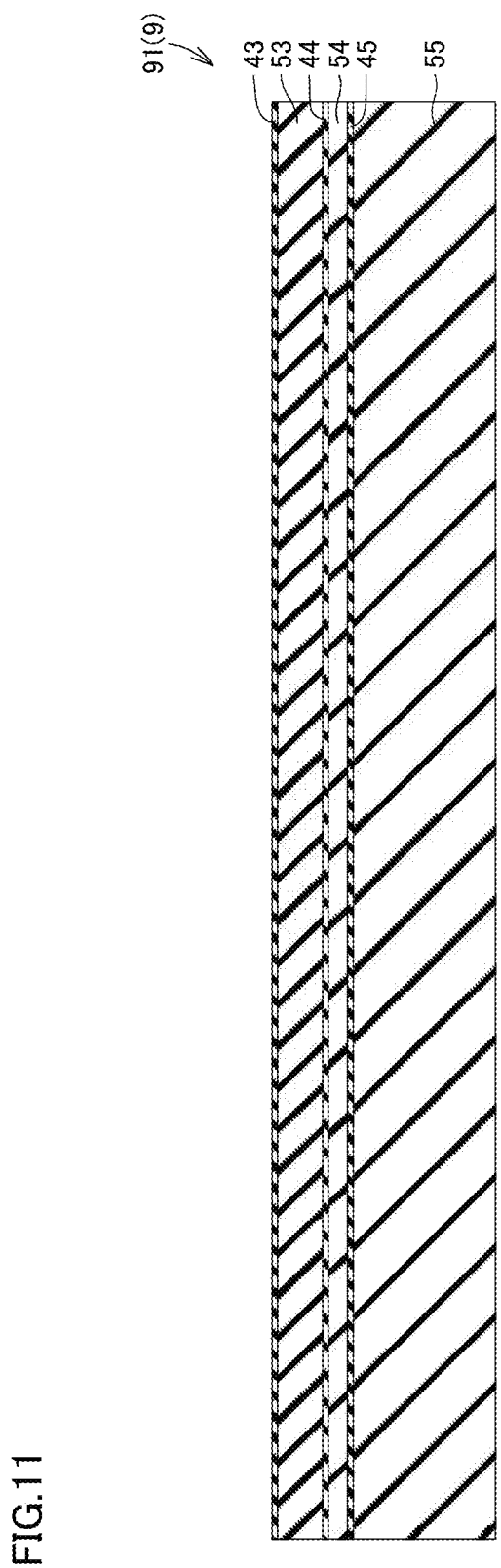
FIG. 11 is a cross-sectional view schematically showing a construction of a first substrate used for manufacturing of the ultrasonic transducer according to the second embodiment.

As shown in FIG. 11, in the preparation step, a first substrate 91 which is substrate 9 is prepared. First substrate 91 is a three-layered SOI substrate. Diaphragm 2 (see FIG. 8) is formed from first substrate 91. First substrate 91 includes a third silicon layer 53, a fourth silicon layer 54, a fifth silicon layer 55, a first surface oxide film 43, a third oxide film 44, and a fourth oxide film 45. First surface oxide film 43, third silicon layer 53, third oxide film 44, fourth silicon layer 54, fourth oxide film 45, and fifth silicon layer 55 are successively layered. Third silicon layer 53 and fourth silicon layer 54 each have a thickness, for example, not smaller than 1 μm and not larger than 100 μm. Fifth silicon layer 55 has a thickness, for example, not smaller than 100 μm and not larger than 600 μm.

Figure 12:
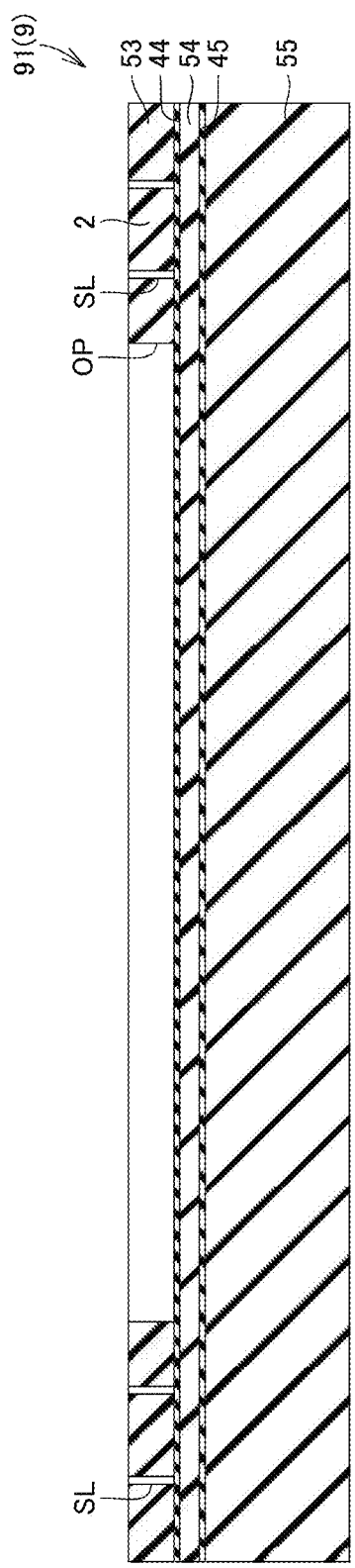
FIG. 12 is a cross-sectional view schematically showing provision of an opening and a slit in the first substrate used for manufacturing of the ultrasonic transducer according to the second embodiment.

In succession, as shown in FIG. 12, in formation step S102, first surface oxide film 43 and third silicon layer 53 are etched and patterned. Opening OP and slit SL are thus provided.

Figure 13:
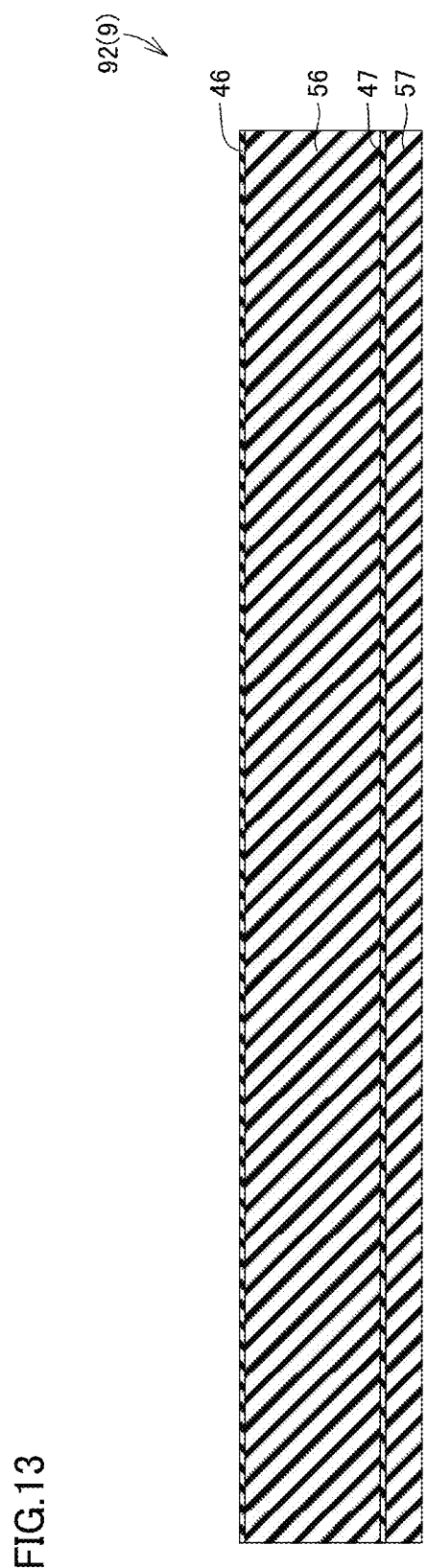
FIG. 13 is a cross-sectional view schematically showing a construction of a second substrate used for manufacturing of the ultrasonic transducer according to the second embodiment.

As shown in FIG. 13, in the preparation step, a second substrate 92 which is substrate 9 is prepared. Second substrate 92 is a two-layered SOI substrate. Housing 1 (see FIG. 8) is formed from second substrate 92. Second substrate 92 includes a sixth silicon layer 56, a seventh silicon layer 57, a second surface oxide film 46, and a fifth oxide film 47. Second surface oxide film 46, sixth silicon layer 56, fifth oxide film 47, and seventh silicon layer 57 are successively layered. Sixth silicon layer 56 has a thickness, for example, not smaller than 100 μm and not larger than 600 μm. Seventh silicon layer 57 has a thickness, for example, not smaller than 1 μm and not larger than 100 μm.

Figure 14:
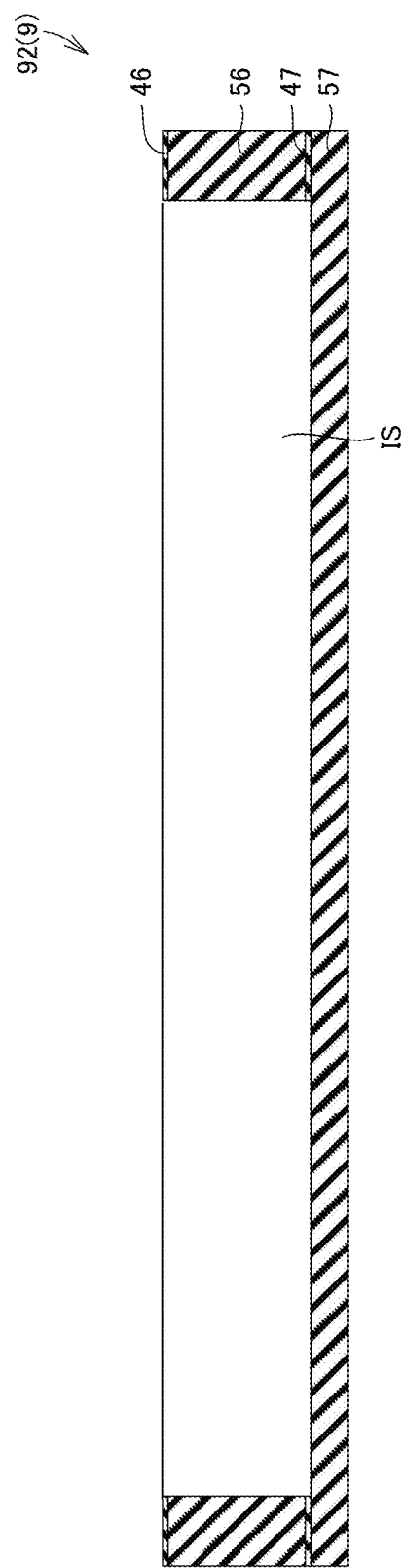
FIG. 14 is a cross-sectional view schematically showing provision of the internal space in the second substrate used for manufacturing of the ultrasonic transducer according to the second embodiment.

In succession, as shown in FIG. 14, second surface oxide film 46 and sixth silicon layer 56 are etched and patterned. Internal space IS is thus provided.

Figure 15:
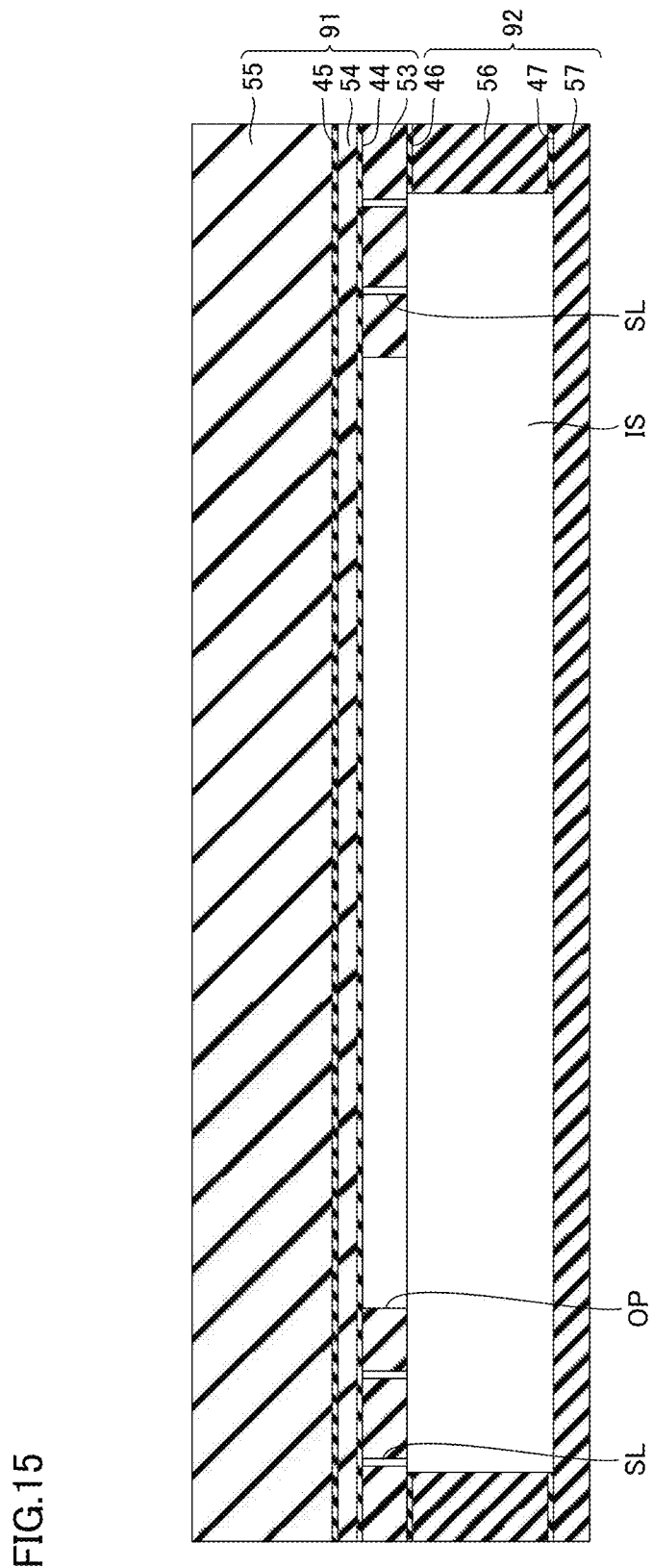
FIG. 15 is a cross-sectional view schematically showing bonding of the first substrate and the second substrate used for manufacturing of the ultrasonic transducer according to the second embodiment.

In succession, as shown in FIG. 15, etched first substrate 91 and etched second substrate 92 are bonded to each other. Specifically, third silicon layer 53 of first substrate 91 and second surface oxide film 46 of second substrate 92 are bonded to each other.

Figure 16:
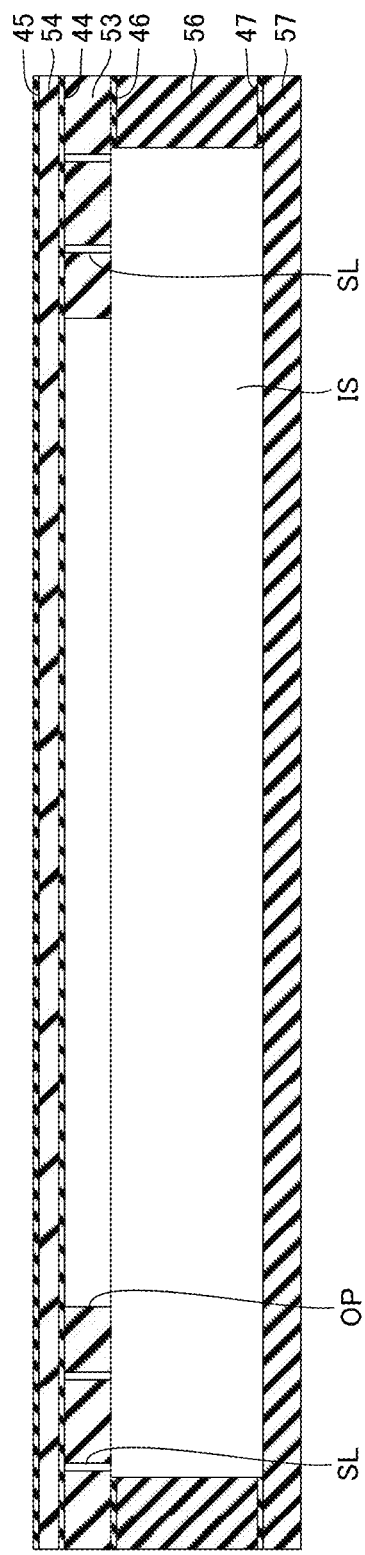
FIG. 16 is a cross-sectional view schematically showing removal of a fifth silicon layer from the first substrate and the second substrate used for manufacturing of the ultrasonic transducer according to the second embodiment.

In succession, as shown in FIGS. 15 and 16, fifth silicon layer 55 is etched away. Fourth oxide film 45 is thus exposed.

Figure 17:
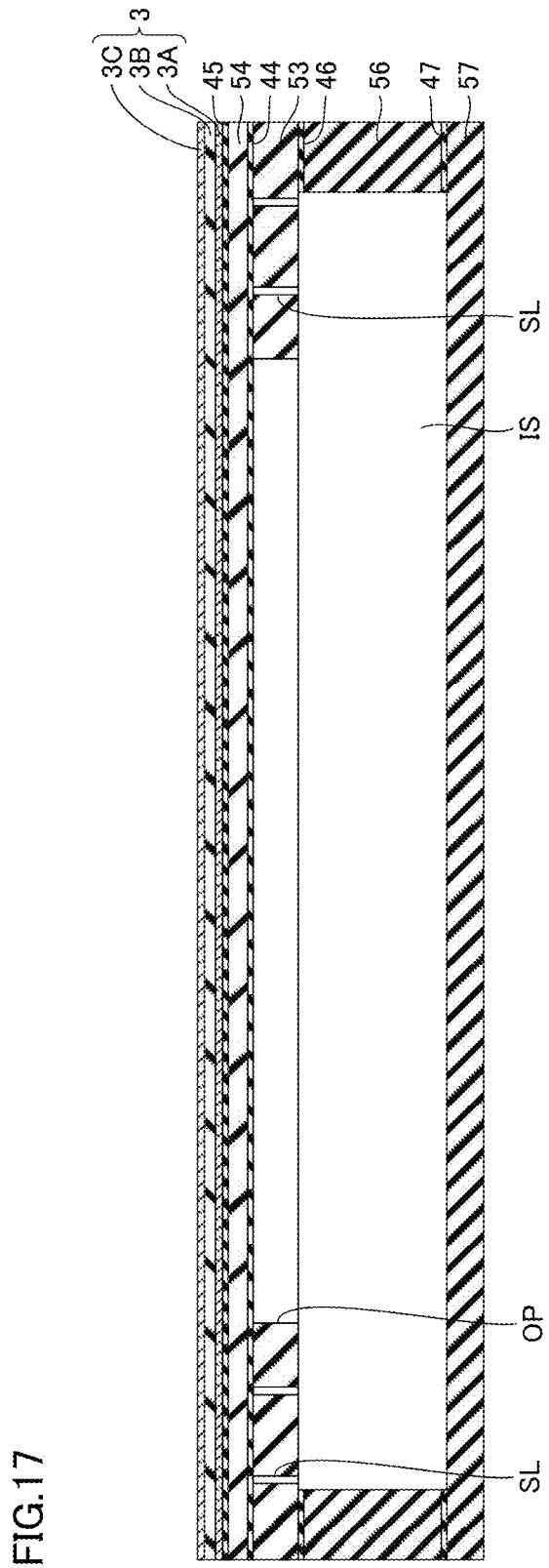
FIG. 17 is a cross-sectional view schematically showing layering of the lower electrode, the piezoelectric thin film, and the upper electrode on the first substrate used for manufacturing of the ultrasonic transducer according to the second embodiment.

In succession, as shown in FIG. 17, lower electrode 3A, piezoelectric thin film 3B, and upper electrode 3C are successively layered on fourth oxide film 45.

In succession, as shown in FIG. 8, lower electrode 3A, piezoelectric thin film 3B, and upper electrode 3C are etched to form first piezoelectric element 3 and second piezoelectric element 30.

Though the three-layered SOI substrate is employed as first substrate 91 as shown in FIG. 11, first substrate 91 is not limited to the three-layered SOI substrate because fifth silicon layer 55 is used only for support of the substrate and not included in a final structure. For example, when a wafer is rigid to such an extent as not interfering conveyance in a semiconductor process, a two-layered SOI substrate may be employed as first substrate 91. A dummy wafer may be employed as fifth silicon layer 55.

A function and effect of the present embodiment will be described in succession.

According to ultrasonic transducer 100 according to the second embodiment, as shown in FIGS. 9 and 10, housing 1 and diaphragm 2 are constructed to vary the volume of internal space IS. Therefore, a height dimension from bottom 12 of housing 1 to diaphragm 2 can be varied. The resonance frequency of the acoustic resonance structure can thus be varied. Therefore, the resonance frequency of the acoustic resonance structure can be varied to rectify a difference between the resonance frequency of diaphragm 2 and the resonance frequency of housing 1 due, for example, to a manufacturing error. Therefore, lowering in effect of acoustic amplification by resonation can be suppressed.

As shown in FIGS. 8 to 10, beam 6 can be bent along the direction in which housing 1 and diaphragm 2 are connected to each other. Therefore, the height dimension from bottom 12 of housing 1 to diaphragm 2 can be varied by movement of central portion 21 caused by deformation of beam 6. Therefore, the resonance frequency of the acoustic resonance structure can be varied by deformation of beam 6. Therefore, lowering in effect of acoustic amplification by resonation can be suppressed by deformation of beam 6.

As shown in FIG. 8, second piezoelectric element 30 is connected to beam 6. Therefore, beam 6 can be deformed by application of the voltage to second piezoelectric element 30.

As shown in FIG. 6, beam 6 includes the plurality of beam portions 60. As shown in FIGS. 7 to 10, the plurality of beam portions 60 can be bent along the direction in which housing 1 and diaphragm 2 are connected to each other. Therefore, the volume of internal space IS can be varied by deformation of the plurality of beam portions 60. Therefore, the volume of internal space IS can be varied more readily than in an example where single beam 6 is provided. Therefore, lowering in effect of acoustic amplification by resonation can readily be suppressed.

Third Embodiment

A construction of ultrasonic transducer 100 according to a third embodiment will now be described with reference to FIG. 18. The third embodiment is identical in construction, manufacturing method, and function and effect to the second embodiment unless particularly described. Therefore, features identical to those in the second embodiment have identical reference characters allotted and description will not be repeated.

Figure 18:
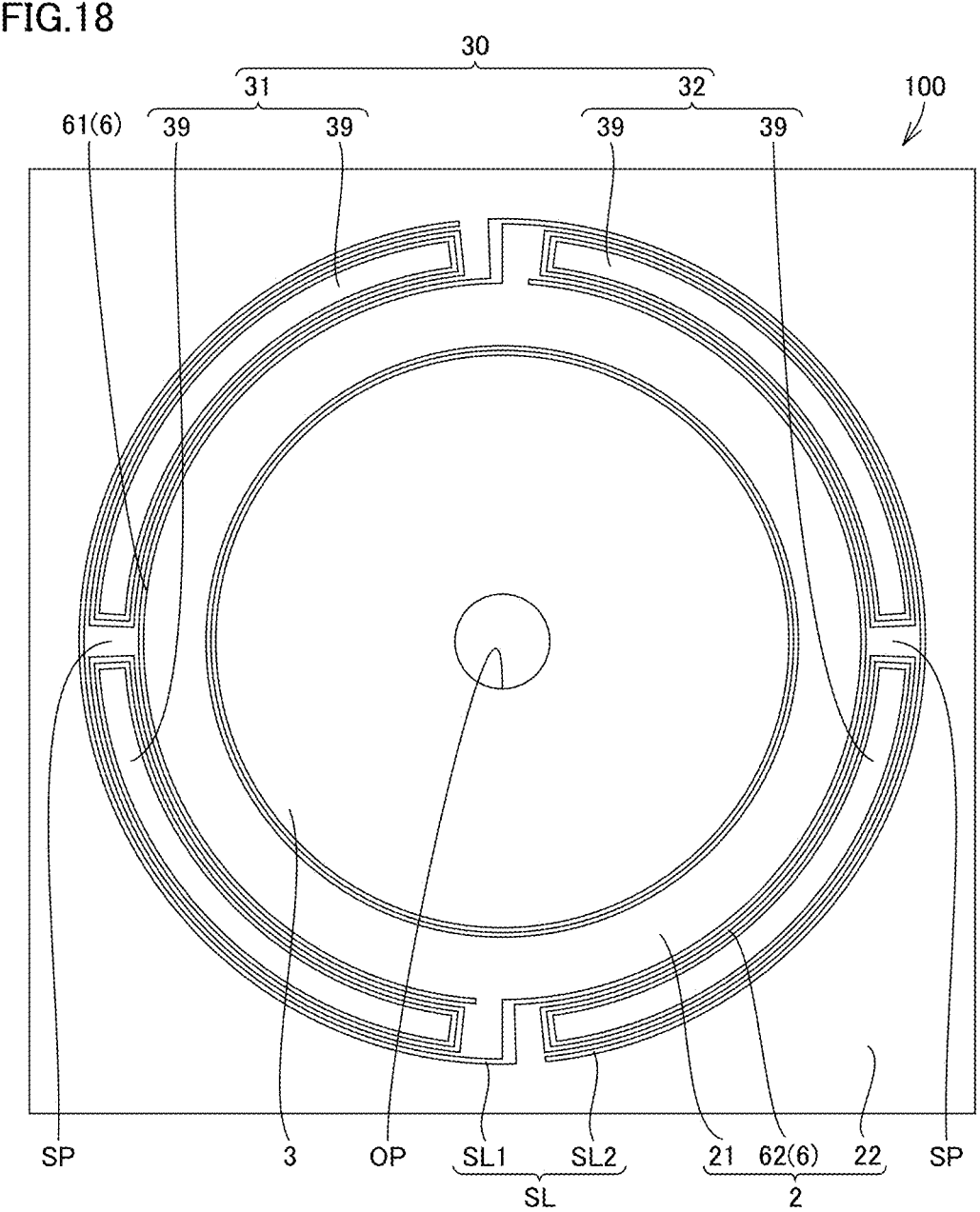
FIG. 18 is a top view schematically showing a construction of the ultrasonic transducer according to a third embodiment.

As shown in FIG. 18, second piezoelectric element 30 of ultrasonic transducer 100 according to the present embodiment includes a plurality of element portions 39. In the present embodiment, first element 31 includes the plurality of element portions 39. Second element 32 includes the plurality of element portions 39. In other words, each of first element 31 and second element 32 is divided into the plurality of element portions 39.

The plurality of element portions 39 are arranged with a space SP being interposed therebetween along a longitudinal direction of beam 6. In other words, the plurality of element portions 39 are physically isolated from each other. The plurality of element portions 39 are constructed such that independent input signals are applied thereto, respectively.

In the present embodiment, first element 31 includes, for example, two element portions 39. Each of two element portions 39 of first element 31 is connected to first beam portion 61. Two element portions 39 of first element 31 are arranged with space SP being interposed therebetween along the longitudinal direction of first beam portion 61.

Second element 32 includes, for example, two element portions 39. Each of two element portions 39 of second element 32 is connected to second beam portion 62. Two element portions 39 of second element 32 are arranged with space SP being interposed therebetween along the longitudinal direction of second beam portion 62.

Figure 19:
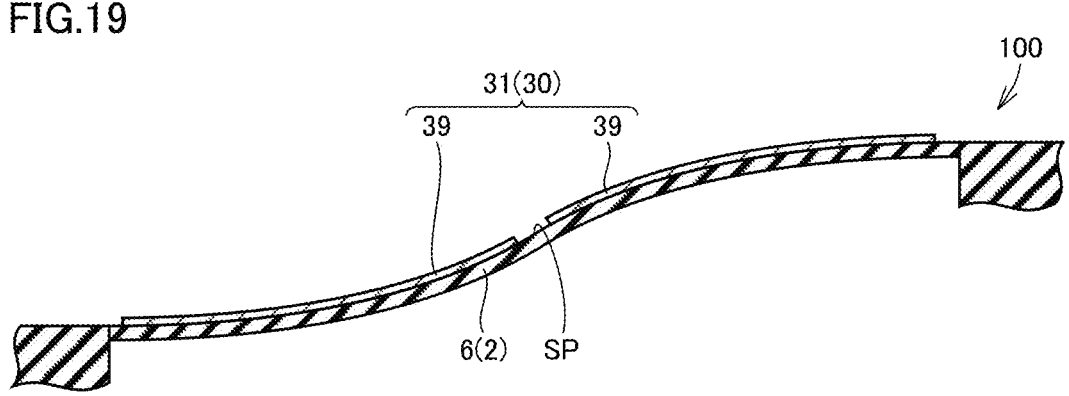
FIG. 19 is a schematic cross-sectional view schematically showing deformation of the beam of the ultrasonic transducer according to the third embodiment.

As shown in FIG. 19, an operation of ultrasonic transducer 100 according to the third embodiment will now be described.

Voltages reverse in phase to each other are applied to two element portions 39 of first element 31. As shown in FIG. 19, each of two element portions 39 of first element 31 and each of two element portions 39 of second element 32 are thus deformed. Deformation of one of two element portions 39 of first element 31 is symmetrical to deformation of the other of them, with the center in the longitudinal direction of first beam portion 61 being defined as the center. Since first beam portion 61 is deformed by deformation of two element portions 39 of first element 31 symmetrical with respect to the center in the longitudinal direction of first beam portion 61, the sign of a curvature of deformation of first beam portion 61 is reversed at the center in the longitudinal direction.

Though not shown, similarly to first element 31, deformation of one of two element portions 39 of second element 32 is in point symmetry to deformation of the other of them, with the center in the longitudinal direction of second beam portion 62 being defined as the center. Since second beam portion 62 is deformed by deformation of two element portions 39 of second element 32 symmetrical with respect to the center in the longitudinal direction of second beam portion 62, the sign of the curvature of deformation of second beam portion 62 is reversed at the center in the longitudinal direction.

A function and effect of the present embodiment will be described in succession.

Figure 20:
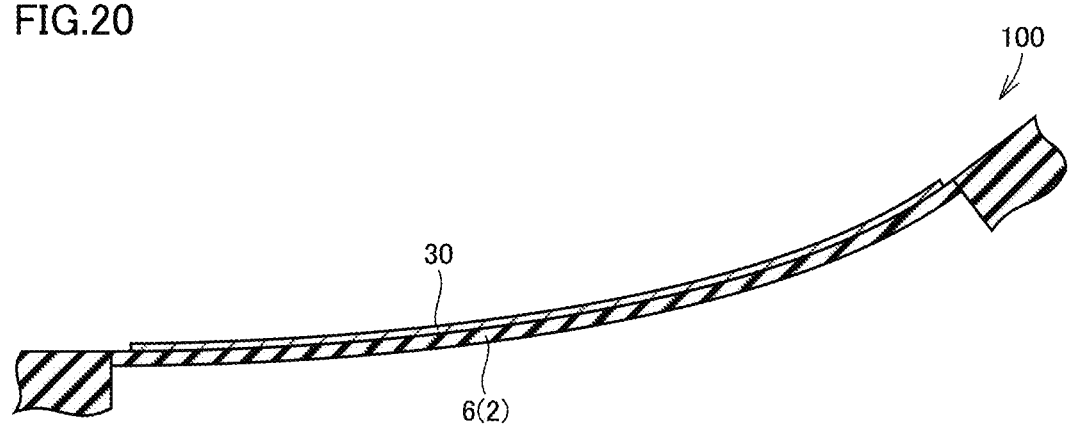
FIG. 20 is a schematic cross-sectional view schematically showing deformation of the beam of the ultrasonic transducer according to the second embodiment.

According to ultrasonic transducer 100 according to the third embodiment, as shown in FIG. 18, the plurality of element portions 39 are arranged with space SP being interposed therebetween along the longitudinal direction of beam 6. Therefore, as shown in FIG. 19, stress applied to beam 6 at the time of deformation of two element portions 39 of first element 31 is released in space SP (gap) between two element portions 39 of first element 31. Therefore, stress applied to beam 6 at the time of deformation of the plurality of element portions 39 is smaller than stress applied to beam 6 in an example where second piezoelectric element 30 is formed from a single element portion (see FIG. 20). Therefore, stress applied to beam 6 can be lowered. Two element portions 39 of second element 32 are also small in stress, as in first element 31.

Fourth Embodiment

A construction of ultrasonic transducer 100 according to a fourth embodiment will now be described with reference to FIG. 21. The fourth embodiment is identical in construction, manufacturing method, and function and effect to the second embodiment unless particularly described. Therefore, features identical to those in the second embodiment have identical reference characters allotted and description will not be repeated.

Figure 21:
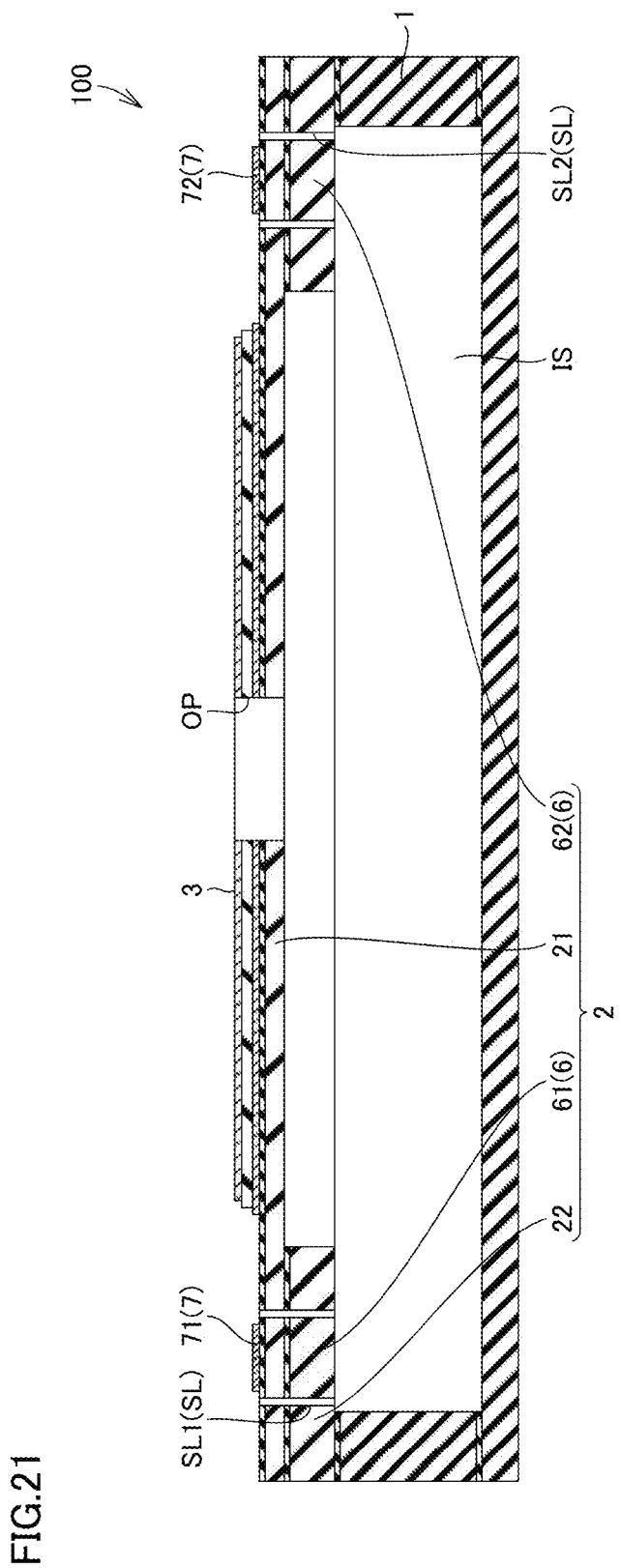
FIG. 21 is a cross-sectional view schematically showing a construction of the ultrasonic transducer according to a fourth embodiment.

As shown in FIG. 21, ultrasonic transducer 100 according to the present embodiment further includes a film portion 7. Film portion 7 is connected to beam 6. Ultrasonic transducer 100 does not include second piezoelectric element 30 (see FIG. 8). In other words, ultrasonic transducer 100 includes film portion 7 in place of second piezoelectric element 30. Film portion 7 is different in coefficient of thermal expansion from diaphragm 2. Film portion 7 is, for example, a film made of metal. Ultrasonic transducer 100 is constructed to feed a current to film portion 7.

In the present embodiment, film portion 7 includes a first film part 71 and a second film part 72. First film part 71 is connected to first beam portion 61. Second film part 72 is connected to second beam portion 62. Each of first film part 71 and second film part 72 is different in coefficient of thermal expansion from diaphragm 2.

An operation of ultrasonic transducer 100 according to the fourth embodiment will now be described.

As a current is fed to film portion 7, resultant Joule heat heats film portion 7 and beam 6. As the temperature increases, film portion 7 and beam 6 expand. Since film portion 7 is different in coefficient of thermal expansion from diaphragm 2, an amount of deformation of film portion 7 is different from an amount of deformation of diaphragm 2. Beam 6 is bent by a difference between the amount of deformation of film portion 7 and the amount of deformation of diaphragm 2.

A function and effect of the present embodiment will be described in succession.

According to ultrasonic transducer 100 according to the fourth embodiment, as shown in FIG. 21, film portion 7 is different in coefficient of thermal expansion from diaphragm 2. Therefore, the amount of deformation of film portion 7 when film portion 7 and beam 6 are heated is different from the amount of deformation of diaphragm 2. Therefore, diaphragm 2 is deformed as being pulled by film portion 7 deformed by being heated. In other words, beam 6 can be bent by heating. Therefore, beam 6 can be bent without the use of second piezoelectric element 30 (see FIG. 8).

Fifth Embodiment

A construction of ultrasonic transducer 100 according to a fifth embodiment will now be described with reference to FIG. 22. The fifth embodiment is identical in construction, manufacturing method, and function and effect to the second embodiment unless particularly described. Therefore, features identical to those in the second embodiment have identical reference characters allotted and description will not be repeated.

Figure 22:
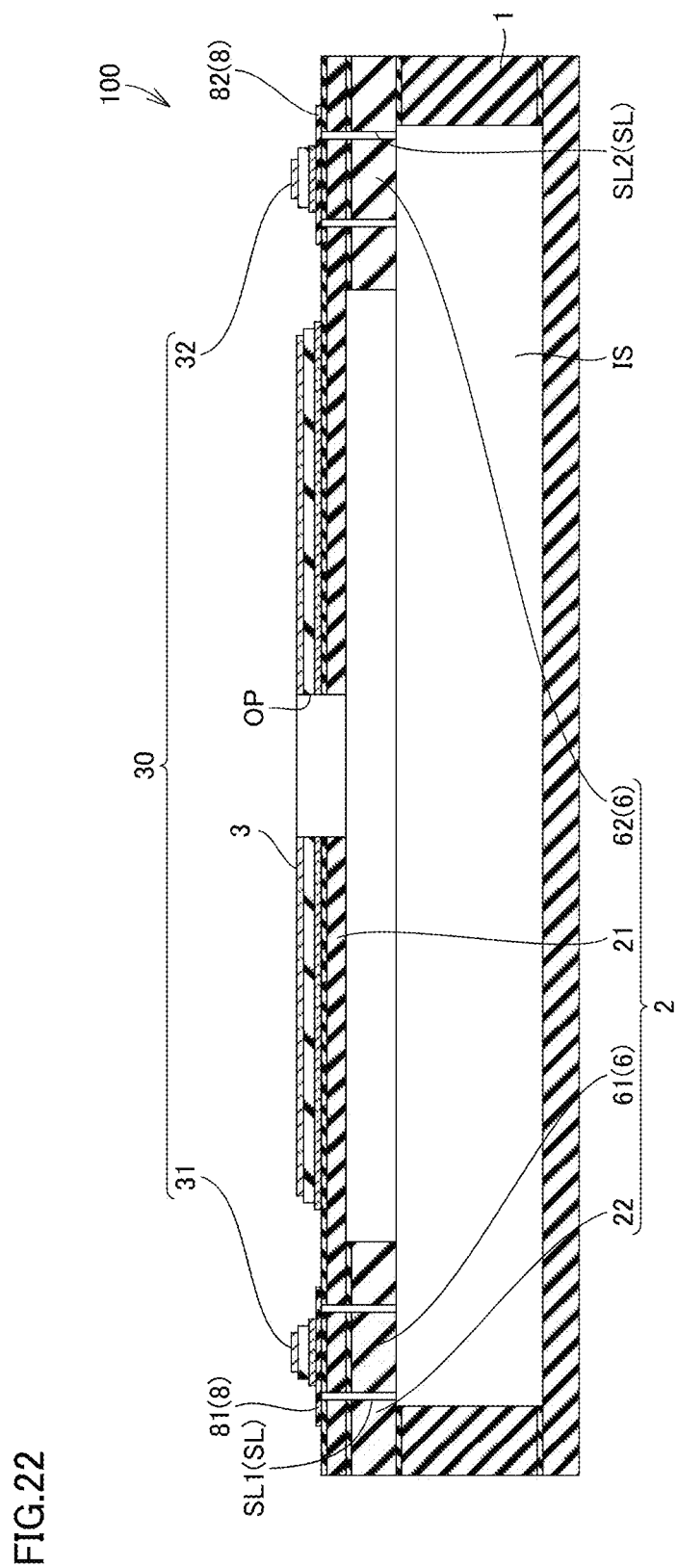
FIG. 22 is a cross-sectional view schematically showing a construction of the ultrasonic transducer according to a fifth embodiment.

As shown in FIG. 22, ultrasonic transducer 100 according to the present embodiment further includes cover portion 8. Cover portion 8 is lower in rigidity than diaphragm 2. Therefore, cover portion 8 is deformable with deformation of diaphragm 2. Cover portion 8 is formed, for example, from an organic film made of parylene or the like. Cover portion 8 may be formed, for example, from a silicon layer decreased in thickness.

Cover portion 8 is arranged on diaphragm 2 to cover slit SL. Cover portion 8 is arranged on diaphragm 2 to expose opening OP. Cover portion 8 is arranged on diaphragm 2 to cover first slit portion SL1 and second slit portion SL2. So long as first slit portion SL1 and second slit portion SL2 are covered, a shape and arrangement of cover portion 8 may be determined as appropriate. Cover portion 8 may be, for example, in an annular shape to cover the entire slit SL. Cover portion 8 may be arranged on diaphragm 2, for example, to cover the entire surface of central portion 21, outer peripheral portion 22, and beam 6 of diaphragm 2. In the present embodiment, second piezoelectric element 30 is connected to beam 6 with cover portion 8 being interposed.

In the present embodiment, cover portion 8 includes a first cover part 81 and a second cover part 82. First cover part 81 and second cover part 82 cover first slit portion SL1 and second slit portion SL2, respectively.

A method of manufacturing ultrasonic transducer 100 according to the fifth embodiment will now be described.

Cover portion 8 is arranged on a wafer (substrate 9 (see FIG. 4)), for example, before second piezoelectric element 30 is formed. In succession, arranged cover portion 8 is patterned. For example, cover portion 8 may be arranged based on a technique such as ink jet printing at appropriate timing, for example, after patterning of second piezoelectric element 30 or after process of the silicon layer.

A function and effect of the present embodiment will be described in succession.

According to ultrasonic transducer 100 according to the fifth embodiment, as shown in FIG. 22, cover portion 8 is arranged on diaphragm 2 to cover slit SL. Therefore, leakage of air in internal space IS through slit SL to the outside of internal space IS can be suppressed. Air in internal space IS tends to leak when slit SL is too large in width. Therefore, lowering in effect of amplification by acoustic resonation due to leakage of air can be suppressed.

Sixth Embodiment

A construction of ultrasonic transducer 100 according to a sixth embodiment will now be described with reference to FIG. 23. The sixth embodiment is identical in construction, manufacturing method, and function and effect to the second embodiment unless particularly described. Therefore, features identical to those in the second embodiment have identical reference characters allotted and description will not be repeated.

Figure 23:
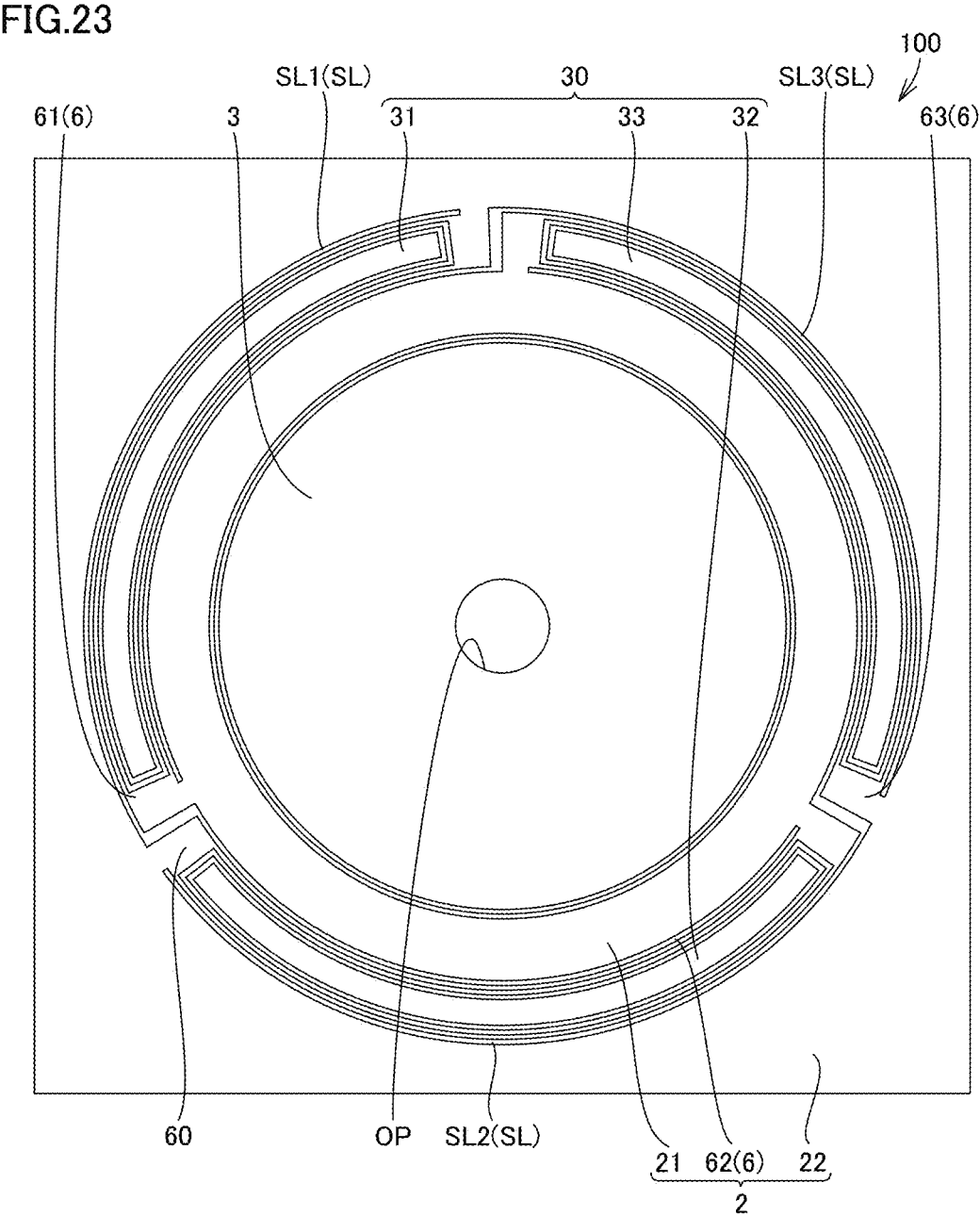
FIG. 23 is a top view schematically showing a construction of the ultrasonic transducer according to a sixth embodiment.

As shown in FIG. 23, each of the plurality of beam portions 60 of ultrasonic transducer 100 according to the present embodiment includes a silicon (Si) substrate having a (1, 1, 1) crystal plane.

In the present embodiment, the plurality of beam portions 60 includes a first beam portion 61, a second beam portion 62, and a third beam portion 63. Each of first beam portion 61, second beam portion 62, and third beam portion 63 includes a silicon (Si) substrate having the (1, 1, 1) crystal plane. First beam portion 61, second beam portion 62, and third beam portion 63 are arranged on a circumference of a circle centered around opening OP. First beam portion 61, second beam portion 62, and third beam portion 63 are equal to one another in shape and length.

Second piezoelectric element 30 includes a first element 31, a second element 32, and a third element 33. First element 31, second element 32, and third element 33 are connected to first beam portion 61, second beam portion 62, and third beam portion 63, respectively. First element 31, second element 32, and third element 33 can vibrate first beam portion 61, second beam portion 62, and third beam portion 63, respectively. First element 31, second element 32, and third element 33 are configured to measure strain of first beam portion 61, second beam portion 62, and third beam portion 63, respectively.

A function and effect of the present embodiment will be described in succession.

According to ultrasonic transducer 100 according to the sixth embodiment, as shown in FIG. 23, each of the plurality of beam portions 60 includes the silicon (Si) substrate having the (1, 1, 1) crystal plane. The mechanical property of (1, 1, 1) of the silicon (Si) substrate is three-fold symmetry. Therefore, amounts of deformation of the plurality of beam portions 60 at the time of application of the same stress to the plurality of beam portions 60 can be equal to one another. Therefore, even in the silicon (Si) substrate with crystal anisotropy, the amounts of deformation of the plurality of beam portions 60 can be equal to one another.

Seventh Embodiment

A construction of a distance measurement apparatus 200 according to a seventh embodiment will now be described with reference to FIG. 24. Ultrasonic transducer 100 of distance measurement apparatus 200 according to the seventh embodiment is identical in construction, manufacturing method, and function and effect to the first embodiment unless particularly described. Therefore, features identical to those in the first embodiment have identical reference characters allotted and description will not be repeated.

Figure 24:
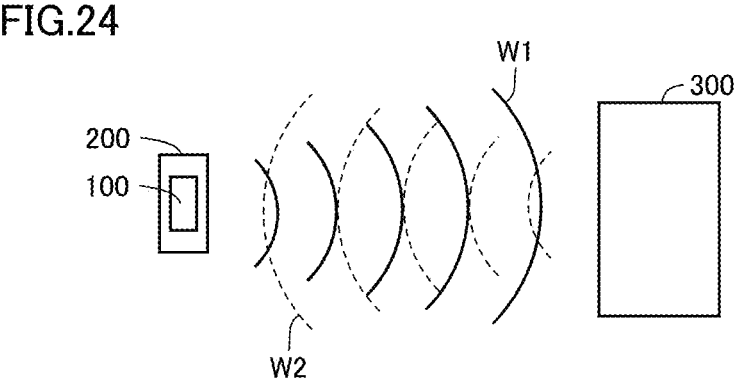
FIG. 24 is a schematic diagram schematically showing a construction of a distance measurement apparatus according to a seventh embodiment.

As shown in FIG. 24, distance measurement apparatus 200 according to the present embodiment includes ultrasonic transducer 100 according to any one of the first to sixth embodiments.

Distance measurement apparatus 200 is distance measurement apparatus 200 to measure a distance from distance measurement apparatus 200 to an object 300. Distance measurement apparatus 200 is configured to measure a distance from distance measurement apparatus 200 to object 300 based on the time-of-flight principle. Specifically, distance measurement apparatus 200 is configured to transmit ultrasound W1 to object 300. Distance measurement apparatus 200 is configured to receive ultrasound W2 reflected by the object. Distance measurement apparatus 200 is configured to measure a distance from distance measurement apparatus 200 to object 300 based on a time period from transmission of ultrasound W1 until reception of ultrasound W2.

As first piezoelectric element 3 which has received input of an electrical signal vibrates diaphragm 2 at the resonance frequency, ultrasound W1 at the resonance frequency is generated. Ultrasound W1 is amplified by the acoustic resonance structure. Amplified ultrasound W1 is transmitted toward object 300 as transmission waves from ultrasonic transducer 100. Ultrasound W1 is reflected by object 300. Reflected ultrasound W2 reaches ultrasonic transducer 100 as reflected waves. Ultrasound W2 that reaches the ultrasonic transducer is amplified by the acoustic resonance structure. Amplified ultrasound W2 vibrates diaphragm 2 by resonation. Vibration of diaphragm 2 is received as an electrical signal by the piezoelectric element arranged on diaphragm 2. A distance L is calculated in an expression (4), where L represents a distance from ultrasonic transducer 100 to object 300, t represents a time period from transmission until reception of sound waves, and c represents a velocity of sound.

$$L = c \times t / 2 \quad \text{Expression (4)}$$

A function and effect of the present embodiment will be described in succession.

According to distance measurement apparatus 200 according to the seventh embodiment, as shown in FIG. 24, distance measurement apparatus 200 includes ultrasonic transducer 100 according to any one of the first to sixth embodiments. Therefore, lowering in dimension accuracy of ultrasonic transducer 100 can be suppressed as in any one of the first to sixth embodiments. Therefore, lowering in dimension accuracy of distance measurement apparatus 200 can be suppressed. Since lowering in sound pressure generated by ultrasonic transducer 100 and sensitivity thereof can be suppressed, lowering in distance sensed by distance measurement apparatus 200 can be suppressed.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST 1 housing; 2 diaphragm; 3 first piezoelectric element; 6 beam; 7 film portion; 8 cover portion; 9 substrate; 21 central portion; 22 outer peripheral portion; 30 second piezoelectric element; 39 element portion; 60 beam portion; 100 ultrasonic transducer; 200 distance measurement apparatus; IS internal space; OP opening; SL slit

The invention claimed is:

1. An ultrasonic transducer comprising:
a diaphragm that can be vibrated;
a housing connected to the diaphragm,
the diaphragm being provided with an opening,
the housing being provided with an internal space that communicates with the opening,
the diaphragm and the housing constituting an acoustic resonance structure to amplify with the opening and the internal space, ultrasound generated by vibration of the diaphragm, the diaphragm and the housing are integrally formed, the diaphragm comprising
- a central portion,
- an outer peripheral portion arranged around the central portion, and
- a beam to connect the central portion and the outer peripheral portion to each other, between the central portion and the outer peripheral portion, the diaphragm being provided with a slit, the slit being provided around the beam, the beam being bendable along a direction in which the diaphragm and the housing are connected to each other; and a piezoelectric element, the piezoelectric element being connected to the beam.

2. The ultrasonic transducer according to claim 1, wherein the diaphragm and the housing are constructed to vary a volume of the internal space.

3. The ultrasonic transducer according to claim 1, further comprising a first piezoelectric element, wherein
the first piezoelectric element is connected to the diaphragm.

4. The ultrasonic transducer according to claim 1, wherein
the piezoelectric element comprises a plurality of element portions, and
the plurality of element portions are arranged with a space being interposed therebetween along a longitudinal direction of the beam.

5. The ultrasonic transducer according to claim 1, further comprising a film portion connected to the beam, wherein
the film portion is different in coefficient of thermal expansion from the diaphragm.

6. The ultrasonic transducer according to claim 1, further comprising a cover portion lower in rigidity than the diaphragm, wherein
the cover portion is arranged on the diaphragm to cover the slit.

7. The ultrasonic transducer according to claim 1, wherein
the beam comprises a plurality of beam portions, and the plurality of beam portions can be bent along the direction in which the diaphragm and the housing are connected to each other.

8. The ultrasonic transducer according to claim 7, wherein
each of the plurality of beam portions comprises a silicon substrate having a (1, 1, 1) crystal plane.

9. A distance measurement apparatus comprising the ultrasonic transducer according to claim 1.

10. A method of manufacturing an ultrasonic transducer, the ultrasonic transducer comprising
a diaphragm that can be vibrated,
a housing connected to the diaphragm,
the diaphragm being provided with an opening,
the housing being provided with an internal space that communicates with the opening,
the diaphragm and the housing constituting an acoustic resonance structure to amplify with the opening and the internal space, ultrasound generated by vibration of the diaphragm, the diaphragm and the housing being integrally formed, the diaphragm comprising
- a central portion,
- an outer peripheral portion arranged around the central portion, and
- a beam to connect the central portion and the outer peripheral portion to each other, between the central portion and the outer peripheral portion, the diaphragm being provided with a slit, the slit being provided around the beam, the beam being bendable along a direction in which the diaphragm and the housing are connected to each other, and a piezoelectric element, the piezoelectric element being connected to the beam, the method comprising:

preparing a substrate; and making the diaphragm and the housing by integral forming from the substrate based on a MEMS manufacturing technology, providing an opening in the diaphragm, and providing the internal space that communicates with the opening in the housing.

* * * * *